(12) United States Patent
Dormody et al.

(10) Patent No.: US 10,602,476 B2
(45) Date of Patent: Mar. 24, 2020

(54) SYSTEMS AND METHODS FOR DETERMINING AN INDOOR OR OUTDOOR LOCATION OF A MOBILE DEVICE

(71) Applicant: NextNav, LLC, Sunnyvale, CA (US)

(72) Inventors: Michael Dormody, San Jose, CA (US); Badrinath Nagarajan, Cupertino, CA (US); Arun Raghupathy, Bangalore (IN)

(73) Assignee: NextNav, LLC, Suunyvale, CA (US)

( * ) Notice: Subject to any disclaimer, the term of this patent is extended or adjusted under 35 U.S.C. 154(b) by 0 days.

(21) Appl. No.: 16/351,271

(22) Filed: Mar. 12, 2019

(65) Prior Publication Data

US 2020/0045668 A1    Feb. 6, 2020

Related U.S. Application Data

(60) Provisional application No. 62/713,476, filed on Aug. 1, 2018.

(51) Int. Cl.
*H04W 64/00* (2009.01)
*G01W 1/02* (2006.01)
*H04W 4/33* (2018.01)
*G01S 5/02* (2010.01)

(52) U.S. Cl.
CPC ......... *H04W 64/003* (2013.01); *G01S 5/0252* (2013.01); *G01W 1/02* (2013.01); *H04W 4/33* (2018.02)

(58) Field of Classification Search
CPC ....... H04W 64/003; H04W 4/33; G01W 1/02; G01S 5/0252
See application file for complete search history.

(56) References Cited

U.S. PATENT DOCUMENTS

| | | | |
|---|---|---|---|
| 8,130,141 B2 | 3/2012 | Pattabiraman et al. | |
| 9,057,606 B2 | 6/2015 | Wolf et al. | |
| 9,980,246 B2 | 5/2018 | Pattabiraman et al. | |
| 2017/0048678 A1* | 2/2017 | Hong | H04W 4/04 |
| 2017/0184405 A1* | 6/2017 | Rachuri | G01C 21/32 |
| 2017/0280301 A1 | 9/2017 | Chang et al. | |
| 2018/0213363 A1* | 7/2018 | Kim | H04W 4/029 |

OTHER PUBLICATIONS

Moffat et al., "Comprehensive comparison of gap-filling techniques for eddy covariance net carbon fluxes", Agricultural and Forest Meteorology, vol. 147, Issues 3-4, Dec. 10, 2007, pp. 209-232.

(Continued)

*Primary Examiner* — Wayne H Cai
(74) *Attorney, Agent, or Firm* — Kyle Pendergrass

(57) ABSTRACT

Determining an indoor or outdoor location of a mobile device. Particular embodiments described herein determine a geographic area of potential locations in which a mobile device resides, identify any buildings that occupy part of the geographic area, and determine if the mobile device does not reside inside any building, the mobile device resides inside a particular building from the identified buildings, or that one or more of the identified buildings are candidate buildings in which the mobile device may reside based on the geographic area and building footprints of the identified buildings.

30 Claims, 12 Drawing Sheets

(56) References Cited

OTHER PUBLICATIONS

Sankaran et al., "Using Mobile Phone Barometer for Low-Power Transportation Context Detection", SenSys '14 Proceedings of the 12th ACM Conference on Embedded Network Sensor Systems, Nov. 3-6, 2014, pp. 191-205.

Henn et al., "A Comparison of Methods for Filling Gaps in Hourly Near-Surface Air Temperature Data", Journal of Hydometeorology, American Meteorological Society, vol. 14, Jun. 2013, pp. 929-945.

Ghaderi et al., "Deep Forecast: Deep Learning-based Spatio-Temporal Forecasting", ICML 2017 Time Series Workshop, Sydney, Australia, 2017, 6 pages.

Germann et al., "Scale-Dependence of the Predictability of Precipitation from Continental Radar Images. Part I: Description of the Methodology", American Meteorological Society, Monthly Weather Review, vol. 130, Dec. 2002, pp. 2859-2873.

* cited by examiner

SYSTEMS AND METHODS FOR DETERMINING AN INDOOR OR OUTDOOR LOCATION OF A MOBILE DEVICE

BACKGROUND

Determining the exact location of a mobile device (e.g., a smart phone operated by a user) in an environment can be quite challenging, especially when the mobile device is located in an urban environment or is located near or within a building. Imprecise estimates of the mobile device's position may have life or death consequences for the user of the mobile device since the imprecise position estimate can delay emergency personnel response times. In less dire situations, imprecise position estimates can lead a user to the wrong area in an environment or can impair other uses of an estimated position of a mobile device.

By way of example, an operational environment 100 in which systems and methods for estimating a position of a mobile device may operate is shown in FIG. 1. The environment 100 includes a network of terrestrial transmitters 110, at least one mobile device 120, and a server 130. Each of the transmitters 110 and the mobile device 120 may be located at different altitudes or depths that are inside or outside various buildings 190. Positioning signals 113 and 153 are respectively transmitted from the transmitters 110 and satellites 150 and later received by the mobile device 120 using known transmission technologies. The transmitters 110 may transmit the signals 113 using one or more common multiplexing parameters—e.g. time slot, pseudorandom sequence, frequency offset, or other, as is known in the art or otherwise disclosed herein. In some embodiments of FIG. 1, each transmitter 110 may include atmospheric sensors (e.g., a pressure sensor and a temperature sensor) for generating measurements of atmospheric conditions (e.g., pressure and temperature) that can be used to estimate an unknown altitude of the mobile device 120, as described later. The mobile device 120 may take different forms, including a mobile phone or other wireless communication device, a portable computer, a navigation device, a tracking device, a receiver, or another suitable device that can receive the signals 113 and/or 153. Examples of possible components in the transmitters 110, the mobile device 120, and the server 130 are shown in FIG. 12 and discussed in the 'Other Aspects' section towards the end of this disclosure.

The network of transmitters 110 and/or the satellites 150 form a positioning system that can be used to determine an initial estimate of the position of the mobile device 120—e.g., where the estimate of the position is represented in terms of: latitude, longitude, and/or altitude coordinates; x, y, and/or z coordinates; angular coordinates; or other representations. Various techniques for estimating the position of the mobile device 120 can be used, including trilateration, which is the process of using geometry to estimate the position of the mobile device 120 using distances traveled by different "positioning" (or "ranging") signals (e.g., signals 113 or signals 153) that are received by the mobile device 120 from beacons (e.g., the terrestrial transmitters 110 or the satellites 150, respectively). If position information like the transmission time and reception time of a positioning signal from a beacon are known, then the difference between those times multiplied by speed of light would provide an estimate of the distance traveled by that positioning signal from that beacon to the mobile device 120. Different estimated distances corresponding to different positioning signals from different beacons can be used along with position information like the locations of those beacons to estimate the initial position of the mobile device 120, as is well-known.

Although the network of transmitters 110 and/or the satellites 150 can be used to determine an initial estimate of the position of the mobile device 120, the resulting initial estimate of the position of the mobile device 120 may only be an approximate position with varying degrees of uncertainty that precludes any conclusion as to whether the mobile device 120 is inside or outside the building 190, especially in urban environments where multipath propagation of positioning signals extends the lengths of estimated distances over which particular signals travel. The uncertainty is typically represented by a well-known location confidence value that estimates one or more possible differences between the estimated position and the true position of the mobile device, which can convey that the mobile device 120 could be either inside the building 190 or outside.

Knowing that the mobile device 120 is actually inside the building 190 or actually outside has many valuable uses, including: (i) uses for detecting opportunities to calibrate a pressure sensor of the mobile device 120 that is used for future altitude estimation of the mobile device 120; (ii) uses for detecting if a mobile device is inside a particular building to improve emergency response times by reducing the search area in which the mobile device resides; (iii) uses for detecting if a mobile device is inside a particular building to retrieve particular information about that building such as a building map or information used to resolve a floor level at which the mobile device is located or other information; (iv) uses for detecting if a mobile device is inside a particular building to collect and store information about that building for later use in different applications that are known in the art; (v) uses for detecting if a mobile device is outside to improve emergency response times by reducing the search area in which the mobile device resides; (vi) uses for detecting if a mobile device is outside to collect and store information about the outside area for later use in different applications that are known in the art; or (vii) other uses. However, determining whether the mobile device 120 is actually inside the building 190 or actually outside with high degrees of certainty is a significant and difficult technical problem that must be solved. Solutions for improved detection of an indoor or outdoor position of a mobile device are described herein.

DETAILED DESCRIPTION

Figure 1:
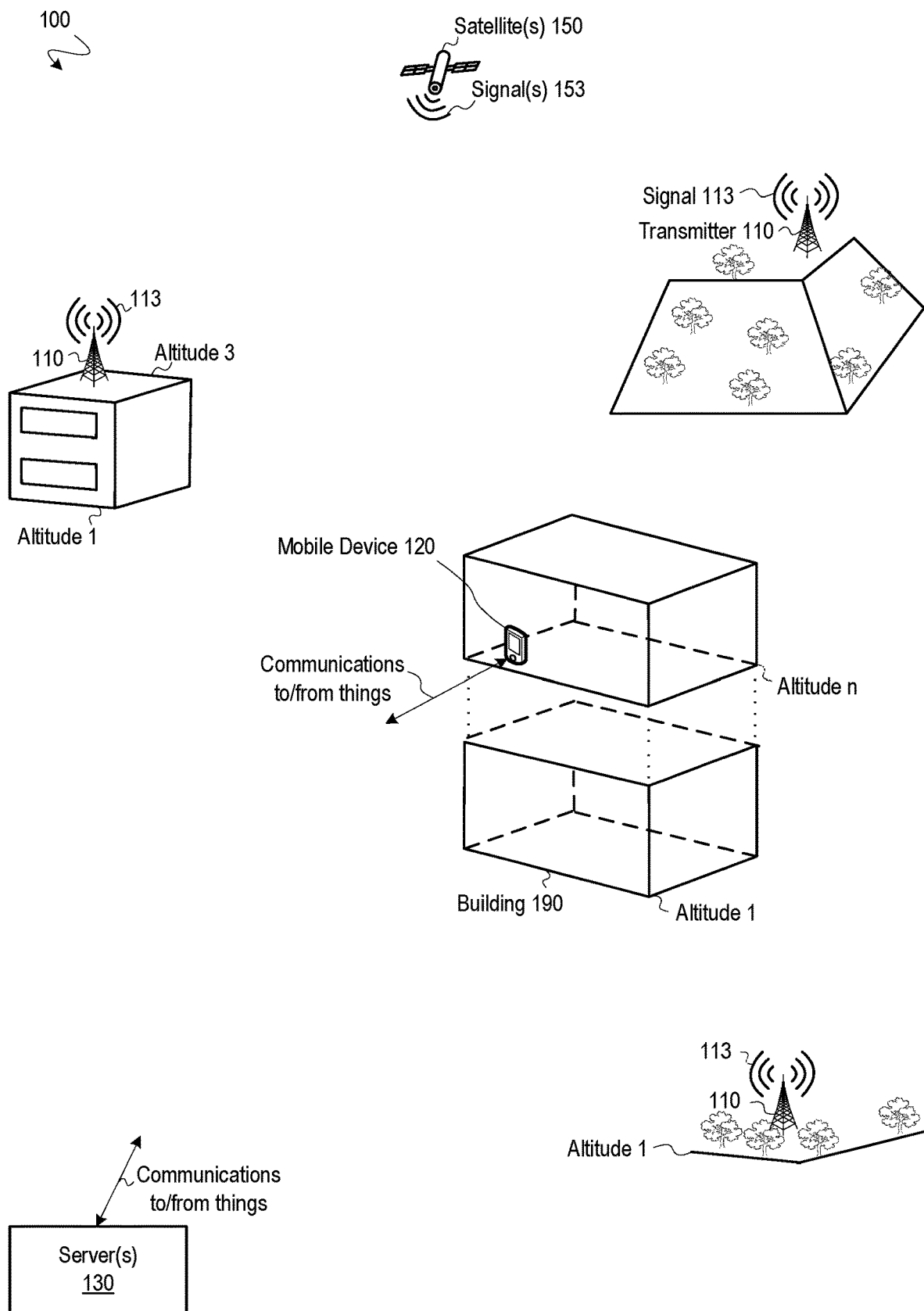
FIG. 1 depicts an operational environment in which systems and methods for estimating a position of a mobile device may operate.

Improved systems and methods for determining an indoor or outdoor location of a mobile device are described below. Such systems and methods may operate in the operational environment 100 of FIG. 1 that is discussed in the Background section, and may make use of a building database that stores and provides suitable information that can be used to determine if a mobile device operated by a user (e.g., the mobile device 120) is inside or outside one or more buildings (e.g., the building 190). By way of example, the information that can be used to determine if a mobile device operated by a user is inside or outside one or more buildings may include: a building footprint defining a two-dimensional geographic area or a three-dimensional volume occupied by a building; a number of floors in the building; heights of floors in the building; and/or a height or altitude of the top of the building. The building database may be a central database that stores all of the information, or a collection of databases that store the information (e.g., one for each building or one for each area of a plurality of areas with different groups of buildings in an environment). The building database may be co-located with the server 130 or located elsewhere (not shown) and may be accessed using known communication technologies. Access to the information in the building database may be provided using known technologies for receiving requests for information from an entity, locating the information, and sending the information to the entity that requested it.

An area containing possible positions of a user's mobile device is often referred to as a "user footprint". Such an area of possible positions can be defined in different ways. For example, a location estimate of the mobile device can be determined using known techniques, such as estimating distances traveled by positioning signals originating from a network of beacons (e.g., GNSS, Wi-Fi, terrestrial, other), and then using a known process referred to as trilateration to determine the location estimate based on the estimated distances and locations of the beacons from which the signals originated. A location confidence value (e.g., an amount of possible error in the location estimate) can also be determined using known techniques. The location estimate and the location confidence value can be used to determine the area of possible positions of the mobile device (i.e., the "user footprint")—e.g., a circular area centered on the location estimate with a radius determined by the location confidence value, or other approach, as is well-known in the art.

The extent by which an area covered by a user footprint corresponding to a mobile device in an environment overlaps with one or more areas of one or more building footprints in the environment can be used to estimate if the mobile device is inside a particular building, inside any of two or more buildings, or outside. For example, if a user footprint is contained entirely within a building footprint of a particular building, then the confidence that a user of the mobile device is inside that building is high, and the location of the user can be treated as being somewhere inside that building. On the other hand, if a user footprint corresponding to a mobile device overlaps with two or more building footprints, or overlaps with a building footprint and an outside area, such as when a location confidence value is low and therefore the error in the location estimate is large enough to expand the user footprint to cover the building(s) and/or the outside, determining that the location of a user of the mobile device is in a particular building or outside becomes unclear, and confidence that the user is inside any particular building or outside is relatively lower. Still, knowledge of a group of buildings in which the user may reside, or knowing the mobile device is either in a single-story building or an outside area, offers an opportunity to calibrate a pressure sensor of the mobile device and can reduce search times during emergency situations. Thus, approaches that constrain possible candidate locations at which a mobile may reside have significant value in terms of calibrating a pressure sensor and also other uses so much so that knowing the candidate locations can be just as useful as knowing the exact location of the mobile device.

Figure 2:
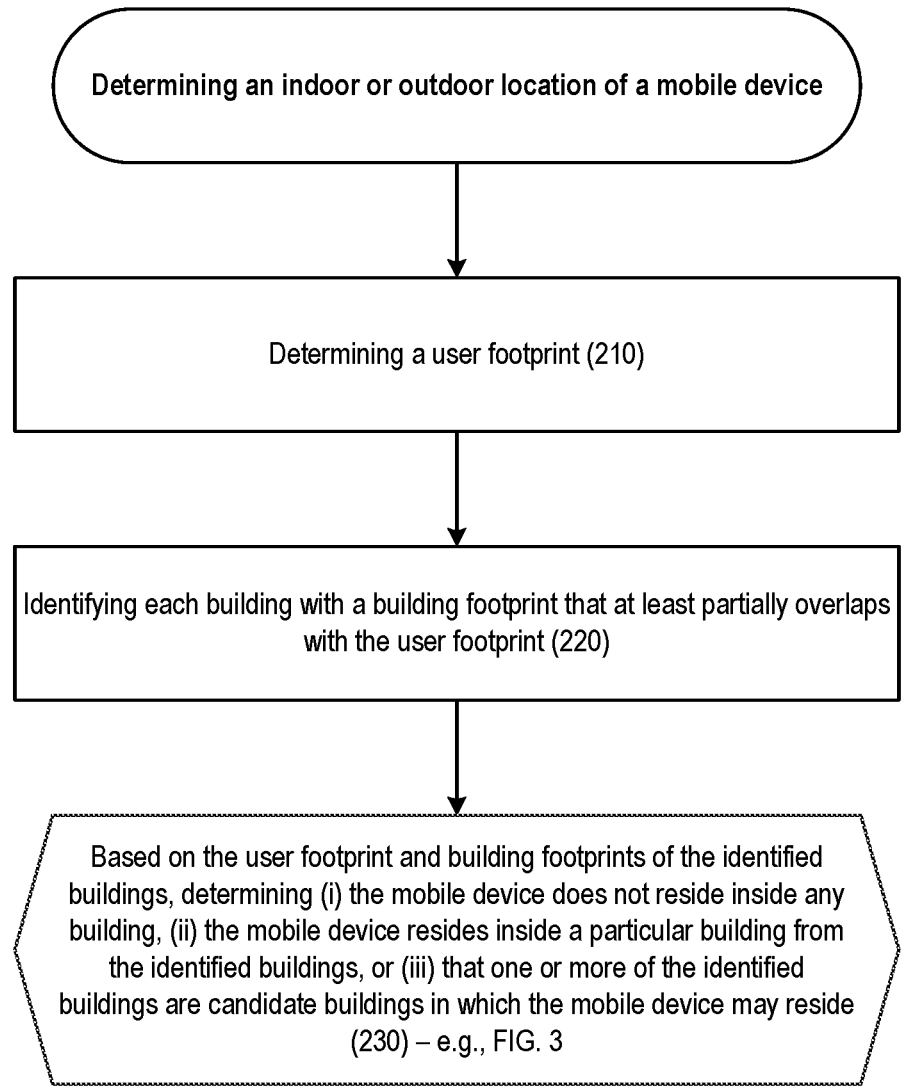
FIG. 2 shows a process for determining an indoor or outdoor location of a mobile device by using a user footprint corresponding to a mobile device along with information from a building database to estimate where the mobile device resides.

A process for determining an indoor or outdoor location of a mobile device is shown in FIG. 2—e.g., by using a user footprint corresponding to a mobile device along with information from a building database (e.g., building footprints) to estimate where the mobile device resides. The estimate of where the mobile device resides may indicate that the mobile device is any of: (i) more likely to be inside than outside, or more likely to be outside than inside; (ii) not inside any building (e.g., outside); (iii) inside a particular building; and/or (iv) inside an unknown building of multiple candidate buildings. Different embodiments consider different possible locations from the preceding location possibilities (i) through (iv). For example: a first embodiment may only consider whether the mobile device is (i) more likely to be inside than outside, or more likely to be outside than inside; a second embodiment may only consider whether the mobile device is (ii) not inside any building (e.g., outside); a third embodiment may only consider whether the mobile device is (iii) inside a particular building; a fourth embodiment may only consider whether the mobile device is (iv) inside an unknown building of multiple candidate buildings;

a fifth embodiment may only consider whether the mobile device is (ii) not inside any building (e.g., outside) or (iii) inside a particular building; a sixth embodiment may only consider whether the mobile device is (ii) not inside any building (e.g., outside), (iii) inside a particular building, or (iv) inside an unknown building of multiple candidate buildings; and so on for any combination of the enumerated location possibilities (i) through (iv).

Initially in the process of FIG. 2, a user footprint is determined (210). In one embodiment, step 210 is performed by any suitable machine, such as a processor of a mobile device or a server. In one implementation of step 210, the user footprint may be determined by estimating a location of the mobile device and generating a location confidence value of the location estimate using known techniques— e.g., where the estimated location may be based on a two-dimensional location estimate specifying a particular latitude and longitude and optionally based on an estimated altitude of the mobile device, and where the location confidence value may be based on a two-dimensional location confidence value and optionally based on an altitude confidence value. In different implementations of step 210, a user footprint can be a two-dimensional shape (e.g., a circle, a polygon, or another planar shape) centered on a two-dimensional location estimate with outer dimensions defined by a location confidence value (e.g., a radius of the circle equal to the location confidence value, or a length from the center of the polygon to an edge or corner of polygon equal to the location confidence value when the location confidence value specifies a possible error as a distance), or a user footprint can be a three-dimensional shape (e.g., a sphere, a polygon volume, or another volumetric shape) centered on a three-dimensional location estimate with outer dimensions defined by a location confidence value (e.g., a radius of the sphere equal to the location confidence value, or a length from the center of the polygon volume to an outer surface or corner of the polygon volume equal to the location confidence value when the location confidence value specifies a possible error as a distance). Any type of user footprint that includes a plurality of possible locations of a mobile device is contemplated.

Each building with a building footprint that at least partially overlaps with the user footprint is identified and optionally designated with a predefined designation, such as an "overlapping building" designation (220). By way of example, the overlapping building designation for a building can be stored as data associated with that building (e.g., stored in local memory of the mobile device or server, or stored in a building database for later retrieval). In one embodiment, step 220 is performed by any suitable machine, such as a processor of the mobile device or a server. In one implementation of step 220, each building with a building footprint that at least partially overlaps with the user footprint is identified by looking up the building footprint of that building from a database and comparing a geographic coverage area of the building footprint to a geographic coverage area of the user footprint to determine if any part of the building footprint is included in the user footprint (e.g., a latitude and longitude pairing inside the building footprint is included among latitude and longitude pairings inside the user footprint).

A determination is made that (i) the mobile device does not reside inside any building, (ii) the mobile device resides inside a particular building from the identified buildings, or (iii) that one or more of the identified buildings are candidate buildings in which the mobile device may reside (230). Use of any of the one or more determinations (i), (ii) and (iii) of step 230 are contemplated. In a first embodiment of step 230, a determination is made as to whether the mobile device does not reside inside any building. In a second embodiment of step 230, a determination is made as to whether the mobile device resides inside a particular building from the identified buildings. In a third embodiment of step 230, a determination is made as to whether one or more of the identified buildings are candidate buildings in which the mobile device may reside. In a fourth embodiment of step 230, a determination is made as to whether the mobile device does not reside inside any building or whether the mobile device resides inside a particular building from the identified buildings. In a fifth embodiment of step 230, a determination is made as to whether the mobile device does not reside inside any building or whether one or more of the identified buildings are candidate buildings in which the mobile device may reside. In a sixth embodiment of step 230, a determination is made as to whether the mobile device resides inside a particular building from the identified buildings or whether one or more of the identified buildings are candidate buildings in which the mobile device may reside. In a seventh embodiment of step 230, a determination is made as to whether the mobile device does not reside inside any building, whether the mobile device resides inside a particular building from the identified buildings or whether one or more of the identified buildings are candidate buildings in which the mobile device may reside. Step 230 may be performed by any suitable machine, such as a processor of the mobile device or a server.

Figure 3:
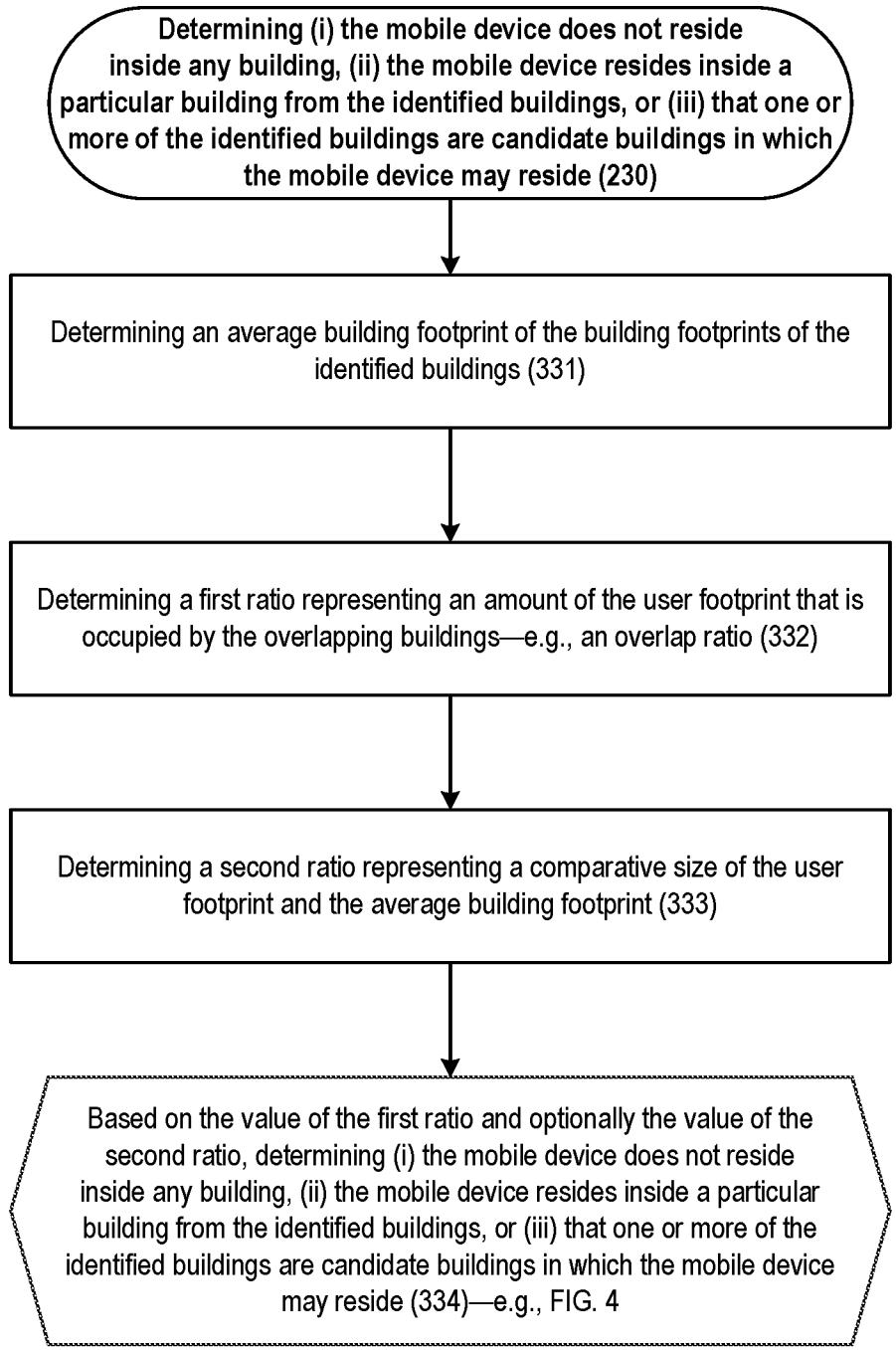
FIG. 3 shows a process for determining whether a mobile device does not reside inside any building, or determining whether one or more buildings with building footprints that at least partially overlap with the user footprint are candidate buildings in which the mobile device may reside.

By way of example, FIG. 3 shows one embodiment step 230 for determining whether the mobile device does not reside inside any building, or that one or more buildings with building footprints that at least partially overlap with the user footprint (e.g., buildings designated as "overlapping buildings") are candidate buildings in which the mobile device may reside.

As shown in FIG. 3, an average building footprint of the building footprints for the buildings that at least partially overlap with the user footprint (e.g., buildings designated as "overlapping buildings") is determined (331). In one embodiment of step 331, the average building footprint is computed as the average of the size of the building footprints for the overlapping buildings. In another embodiment of step 331, the average building footprint is computed as the average of the size of the building footprints for the overlapping buildings and also additional building footprints of additional buildings that are not designated as an overlapping building, where the additional buildings (i) are adjacent to the overlapping buildings, (ii) are within a predefined area that includes the user footprint (e.g., an area centered on the location estimate of the mobile device with boundaries that are a predefined multiple m (e.g., m=1.5, 2 or other number) times the location confidence value from the location estimate of the mobile device), or (iii) meet some other criteria (e.g., within a number of city blocks from the location estimate).

A first ratio representing an amount of the user footprint that is occupied by the overlapping buildings (e.g., an overlap ratio) is determined (332). In one embodiment of step 332, the first ratio is determined as:

$$\text{first ratio} = \frac{\text{sizes of portions of building footprints inside the user footprint}}{\text{size of the user footprint}}. \qquad \text{(Equation 1)}$$

A second ratio representing the comparative size of the user footprint and the average building footprint is determined (333). In one embodiment of step 333, the second ratio is determined as:

$$\text{second ratio} = \frac{\text{size of the user footprint}}{\text{average building footprint}}. \quad \text{(Equation 2)}$$

Based on the value of the first ratio and optionally the value of the second ratio, a determination is made that (i) the mobile device does not reside inside any building, (ii) the mobile device resides inside a particular building from the identified buildings, or (iii) that one or more of the identified buildings are candidate buildings in which the mobile device may reside (334). Use of any of the one or more determinations (i), (ii) and (iii) of step 334 are contemplated. In a first embodiment of step 334, a determination is made as to whether the mobile device does not reside inside any building (i.e., is outside). In a second embodiment of step 334, a determination is made as to whether the mobile device resides inside a particular building from the identified buildings. In a third embodiment of step 334, a determination is made as to whether one or more of the identified buildings are candidate buildings in which the mobile device may reside. In a fourth embodiment of step 334, a determination is made as to whether the mobile device does not reside inside any building or whether the mobile device resides inside a particular building from the identified buildings. In a fifth embodiment of step 334, a determination is made as to whether the mobile device does not reside inside any building or whether one or more of the identified buildings are candidate buildings in which the mobile device may reside. In a sixth embodiment of step 334, a determination is made as to whether the mobile device resides inside a particular building from the identified buildings or whether one or more of the identified buildings are candidate buildings in which the mobile device may reside. In a seventh embodiment of step 334, a determination is made as to whether the mobile device does not reside inside any building, whether the mobile device resides inside a particular building from the identified buildings or whether one or more of the identified buildings are candidate buildings in which the mobile device may reside.

Figure 4:
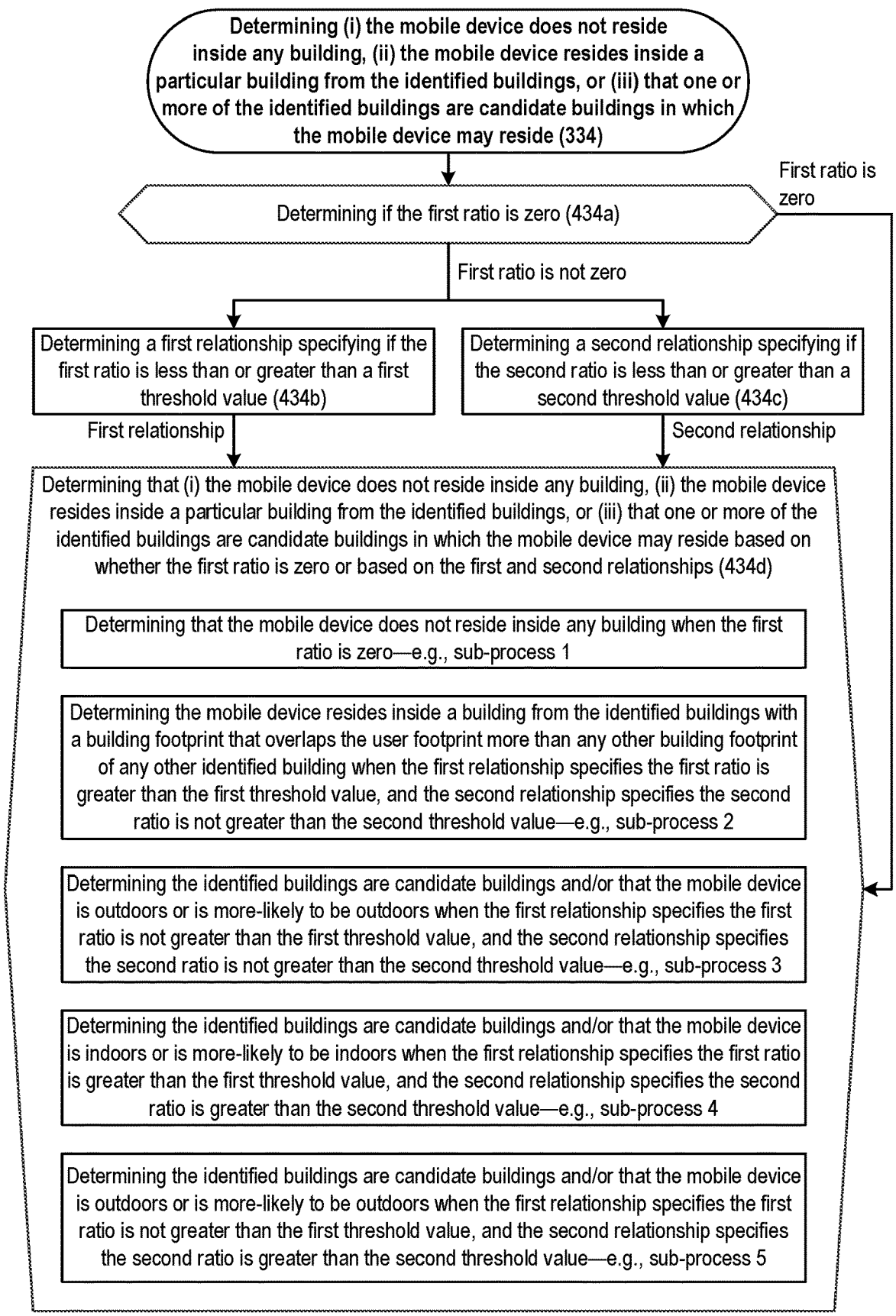
FIG. 4 shows a process for determining, based on relationships between a user footprint and building footprints, whether a mobile device does not reside inside any building, or determining whether one or more buildings with building footprints that at least partially overlap with the user footprint are candidate buildings in which the mobile device may reside.

Different embodiments of step 334 include different combinations the follow steps of FIG. 4: determining if the first ratio is zero (434a); (optionally if the first ratio is not zero) determining a first relationship specifying if the first ratio is less than or greater than a first threshold value, such as a value of 0.5 (434b); (optionally if the first ratio is not zero) determining a second relationship specifying if the second ratio is less than or greater than a second threshold value, such as a value of 2.0 (434c); and determining that (i) the mobile device does not reside inside any building, (ii) the mobile device resides inside a particular building from the identified buildings, or (iii) that one or more of the identified buildings are candidate buildings in which the mobile device may reside based on the results of one or more of steps 434a, 434b and/or 434c (434d)—e.g., based on whether the first ratio is zero or based on the first and second relationships.

The first threshold value is illustrated as being set to 0.5, but the first threshold value does not need to be set to this value in every implementation. The value of 0.5 means that half of the user's footprint is taken up with one or more building footprints, which provides a threshold at which the distribution of possible positions within the user footprint is equally likely to be inside or outside.

The second threshold value is illustrated as being 2.0, but the second threshold value does not need to be set to this value in every implementation. The value of 2.0 means that the size of the user's footprint is twice that of the typical (e.g., average) building footprint in the region, which provides a threshold at which the positioning technology used to determine the user footprint can estimate the user footprint to roughly the size of twice a typical (e.g., average) building. A lower value would require a more accurate (e.g., finer) confidence in relation to determining position and footprint, and a higher value would specify a less accurate (e.g., coarser) confidence in relation to determining position and footprint.

By way of example, different embodiments of step 334 include different combinations of the steps shown in FIG. 4, including: only steps 434a and 434d; all of steps 434a-d; or only steps 434b-d (without the condition of the first ratio needing to be non-zero during steps 434b and 434c).

Different embodiments of the process in FIG. 4 include different combinations of one or more of the following sub-processes during step 434d (e.g., a first embodiment consisting of any one of the sub-processes, a second embodiment consisting of any two of the sub-processes, a third embodiment consisting of any three of the sub-processes, a fourth embodiment consisting of any four of the sub-processes, or a fifth embodiment consisting of the five sub-processes). Steps from FIG. 4 that are used for each of the following sub-processes are identified during the description of each sub-process.

Figure 5:
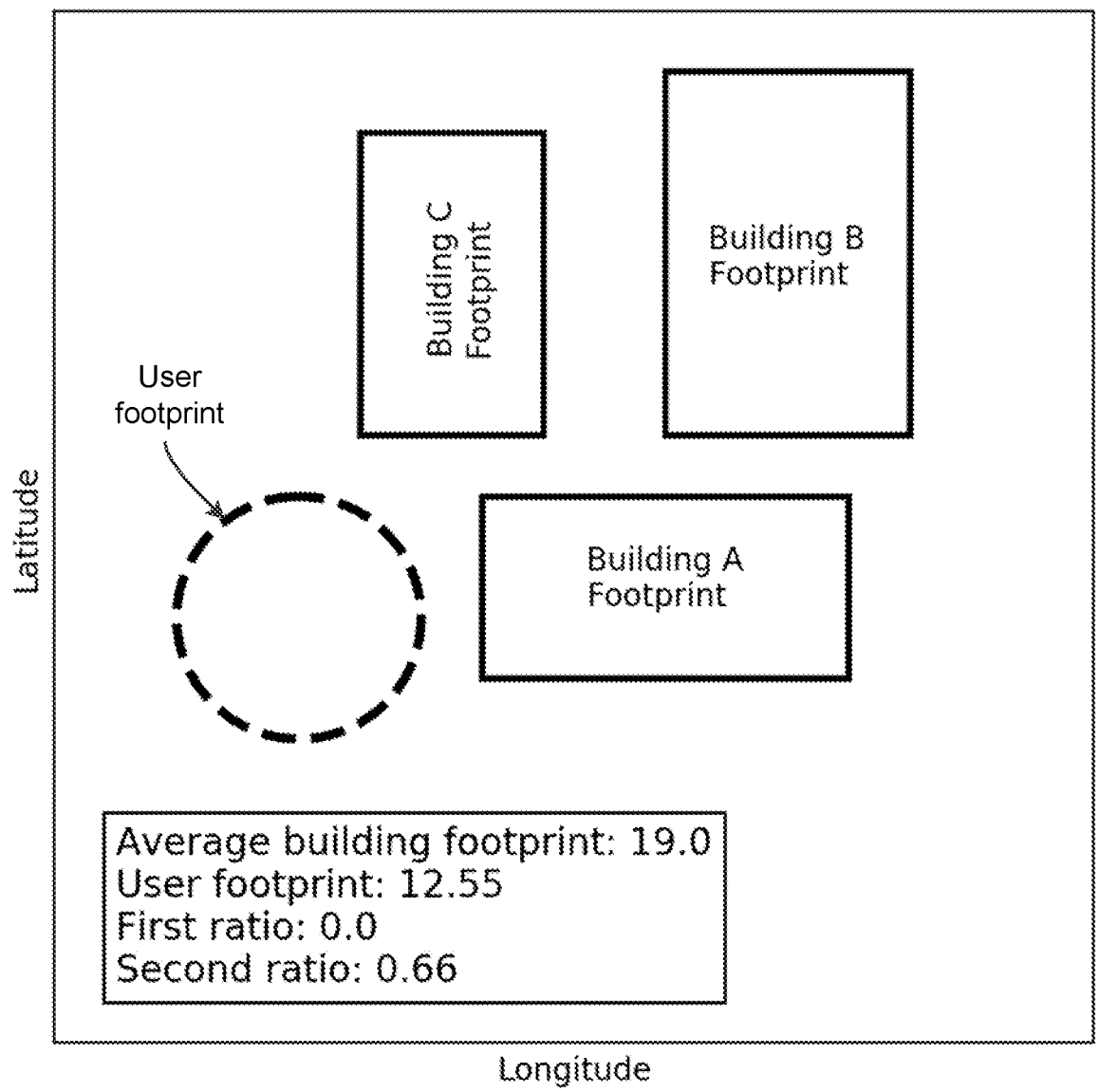
FIG. 5 illustrates a sub-process for determining that a mobile device does not reside inside any building.

Sub-process 1: If the first ratio is determined to be zero as a result of step 434a, a determination is made that the mobile device does not reside inside any building during step 434d—e.g., as illustrated by FIG. 5, if the first ratio is zero, then the user location is determined to be outside. Optionally, if the first ratio is determined to not be zero as a result of step 434a, a determination may be made that identified buildings are candidate buildings in which the mobile device may reside. Steps 434b and 434c need not be performed when sub-process 1 is performed, but can be performed in some embodiments.

Figure 6:
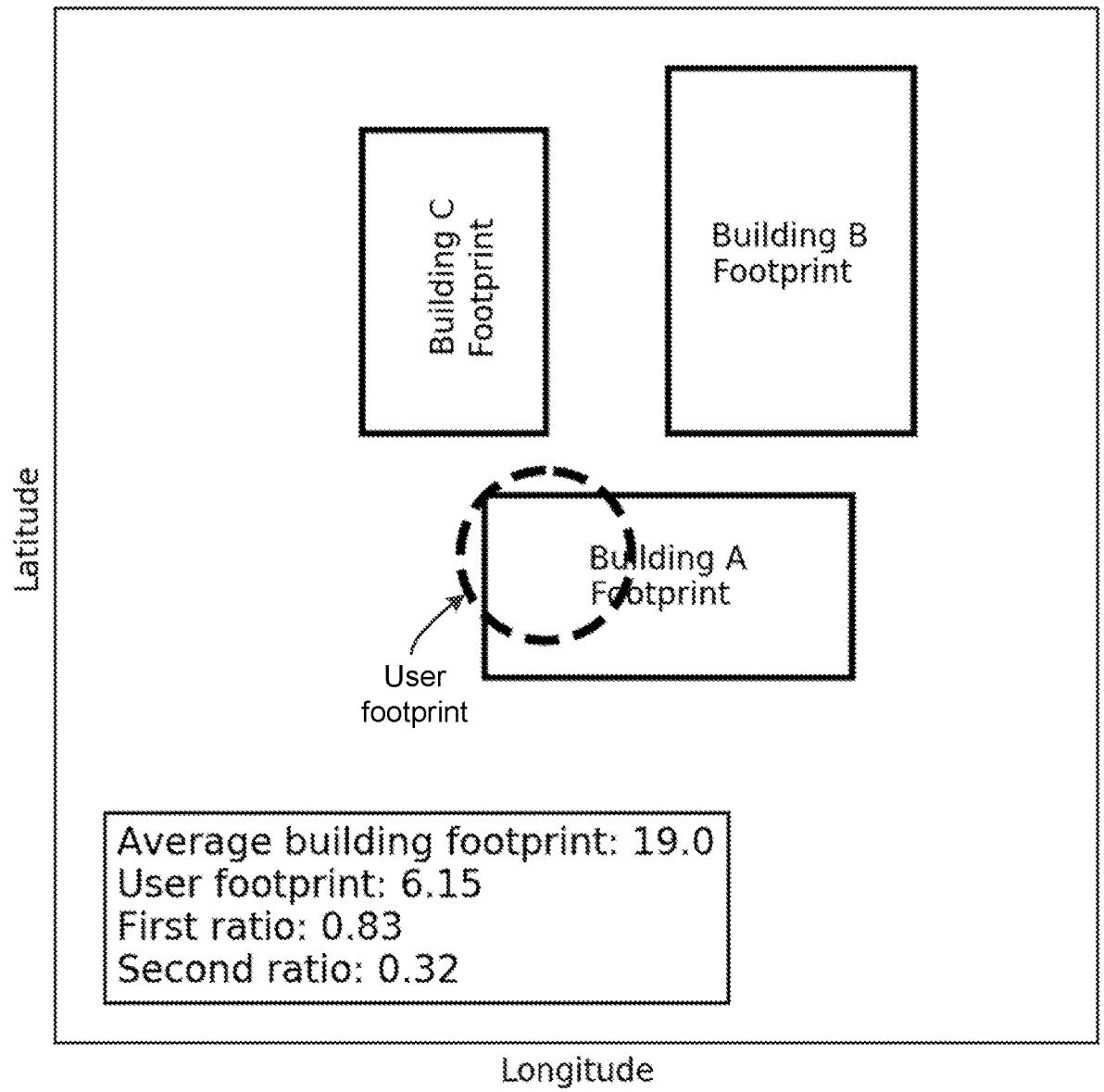
FIG. 6 illustrates a sub-process for determining that a mobile device resides inside a particular overlapping building with a building footprint that overlaps the user footprint more than any other building footprint of any other overlapping building.

Sub-process 2: If the first ratio is determined to exceed the first threshold value during step 434b, and the second ratio is determined to not exceed the second threshold value during step 434c, a determination is made that the mobile device resides inside a particular overlapping building with a building footprint that overlaps the user footprint more than any other building footprint of any other overlapping building during step 434d—e.g., as illustrated by FIG. 6, if the first ratio is greater than the first threshold value (e.g., 0.83 is greater than 0.5), and the second ratio is less than the second threshold value (e.g., 0.32 is less than 2), then the user location is determined to be inside the building with the largest measured overlap (e.g., Building A). If the first ratio is exceeded, then the mobile device is more likely to be inside a building than outside because the possible positions of the mobile device (from the user footprint) are more likely to be inside than outside (e.g., an 83% chance the mobile device is inside). If the second threshold is not exceeded, then the user footprint is less than twice the average building footprint in the area, and it is likely that the possible positions of the mobile device are aligned over only one or two buildings and that one of those buildings has more overlap compared to other buildings and is therefore the most-likely location of the mobile device. As illustrated in FIG. 6, the mobile device is likely in Building A because the mobile device overlaps heavily with Building A (first ratio 0.83>0.5) and does not include other nearby buildings owing to its footprint relative to the footprint of nearby buildings (second ratio 0.32<2.0). In one embodiment of sub-process 2, the particular overlapping building with a building footprint that overlaps the user footprint more than any other building footprint of any other overlapping building is determined by (i) computing, for each building footprint of each of the buildings, a size of the user footprint overlapped by that building footprint, (ii) identifying the largest of the computed sizes, and (iii) selecting, as the particular overlapping building, the building of the building footprint associated with the largest of the computed sizes. Step 434a need not be performed when sub-process 2 is performed, but can be performed in some embodiments. In one embodiment, the largest of the computing sizes must exceed a threshold (e.g., 50% of all building overlap in the user footprint; e.g., at least a multiplier greater than 1 larger than the second largest size, such as 1.5) in order for that building to be selected.

Figure 7:
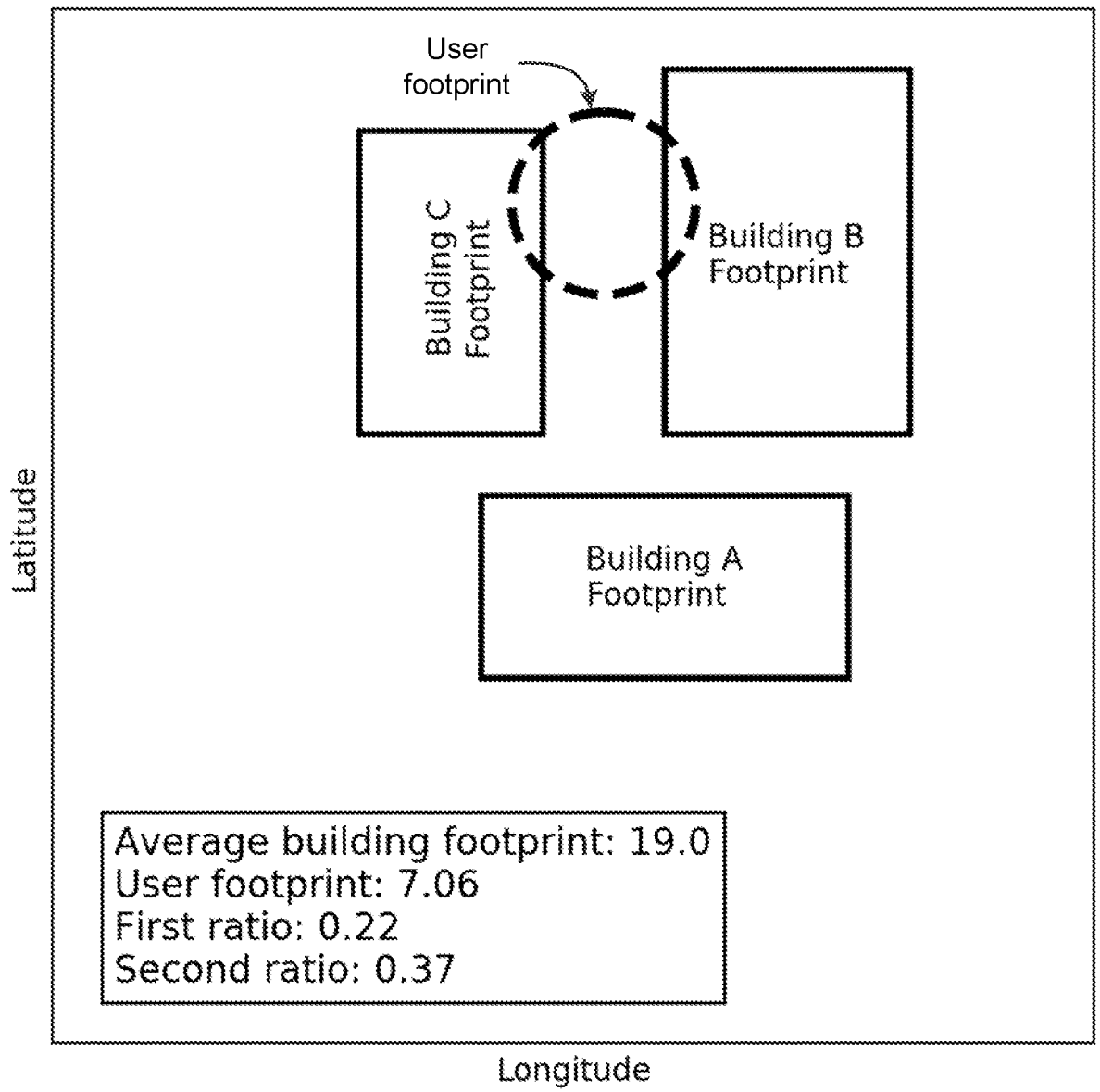
FIG. 7 illustrates a sub-process for determining that overlapping buildings are candidate buildings in which the mobile device may reside, but optionally designating the mobile device as being outdoors.

Sub-process 3: If the first ratio is determined to not exceed the first threshold value during step 434b, and the second ratio is determined to not exceed the second threshold value during step 434c, a determination is made that the overlapping buildings are candidate buildings in which the mobile device may reside, and/or that the mobile device is designated as being outdoors or more-likely to be outdoors than indoors during step 434d—e.g., as illustrated by FIG. 7, if the first ratio is less than the first threshold value (e.g., 0.22 is less than 0.5), and the second ratio is less than the second threshold value (e.g., 0.37 is less than 2), then the user location is determined to be more-likely outside than inside. If the first ratio indicates minimal overlap of possible positions with any buildings (e.g., 0.22<0.5), then the first ratio indicates that mobile device is more likely to be outside than inside because the possible positions of the mobile device (from the user footprint) are more likely to be outside than inside (e.g., an 22% chance the mobile device is inside). Since the second ratio indicates that the user footprint is smaller than the twice the average building footprint (e.g., 0.37<<2.0), a conclusion of being outside due to the first ratio is more certain than in sub-process 5 (discussed later) given the greater certainty of possible positions (i.e., more confident, finer estimates of possible positions of the mobile device due to the smaller footprint size). Thus, a conclusion that the mobile device is outside is reasonably certain. Step 434a need not be performed when sub-process 3 is performed, but can be performed in some embodiments.

Figure 8:
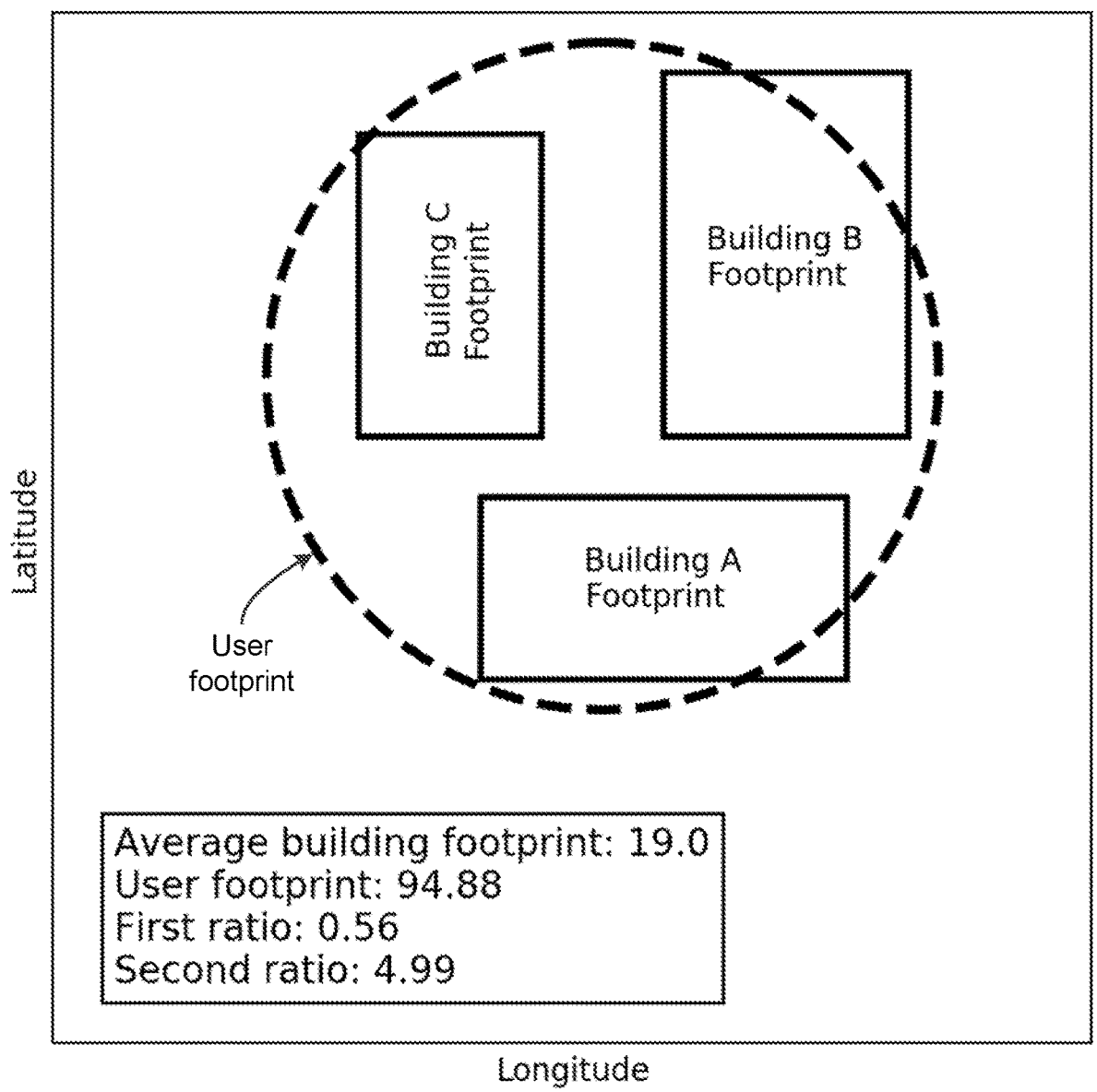
FIG. 8 illustrates a sub-process for determining that overlapping buildings are candidate buildings in which a mobile device may reside, and optionally designating the mobile device as being indoors.

Sub-process 4: If the first ratio is determined to exceed the first threshold value during step 434b, and the second ratio is determined to exceed the second threshold value during step 434c, a determination is made that the overlapping buildings are candidate buildings in which the mobile device may reside, and/or that the mobile device is designated as being indoors, more likely to be indoors than outdoors, or inside one of the candidate buildings during step 434d—e.g., as illustrated by FIG. 8, if the first ratio is greater than the first threshold value (e.g., 0.56 is greater than 0.5), and the second ratio is greater than the second threshold value (e.g., 4.99 is greater than 2), then the overlapping buildings (e.g., Building A, Building B and Building C) are possible locations of the mobile device, and the user location is determined to be more-likely inside than outside. If the first ratio indicates more overlap of possible positions with building(s) than overlap with outside areas of a region (e.g., 0.56>0.5), then the first ratio indicates that mobile device is more likely to be inside than outside. Since the second ratio indicates that the user footprint is much larger than the twice the average building footprint (e.g., 4.99>2.0), a conclusion of being inside one of multiple buildings is reasonable, but identifying the actual building in which the mobile device is most-likely to reside is less certain than sub-process 2. Step 434a need not be performed when sub-process 4 is performed, but can be performed in some embodiments.

Figure 9:
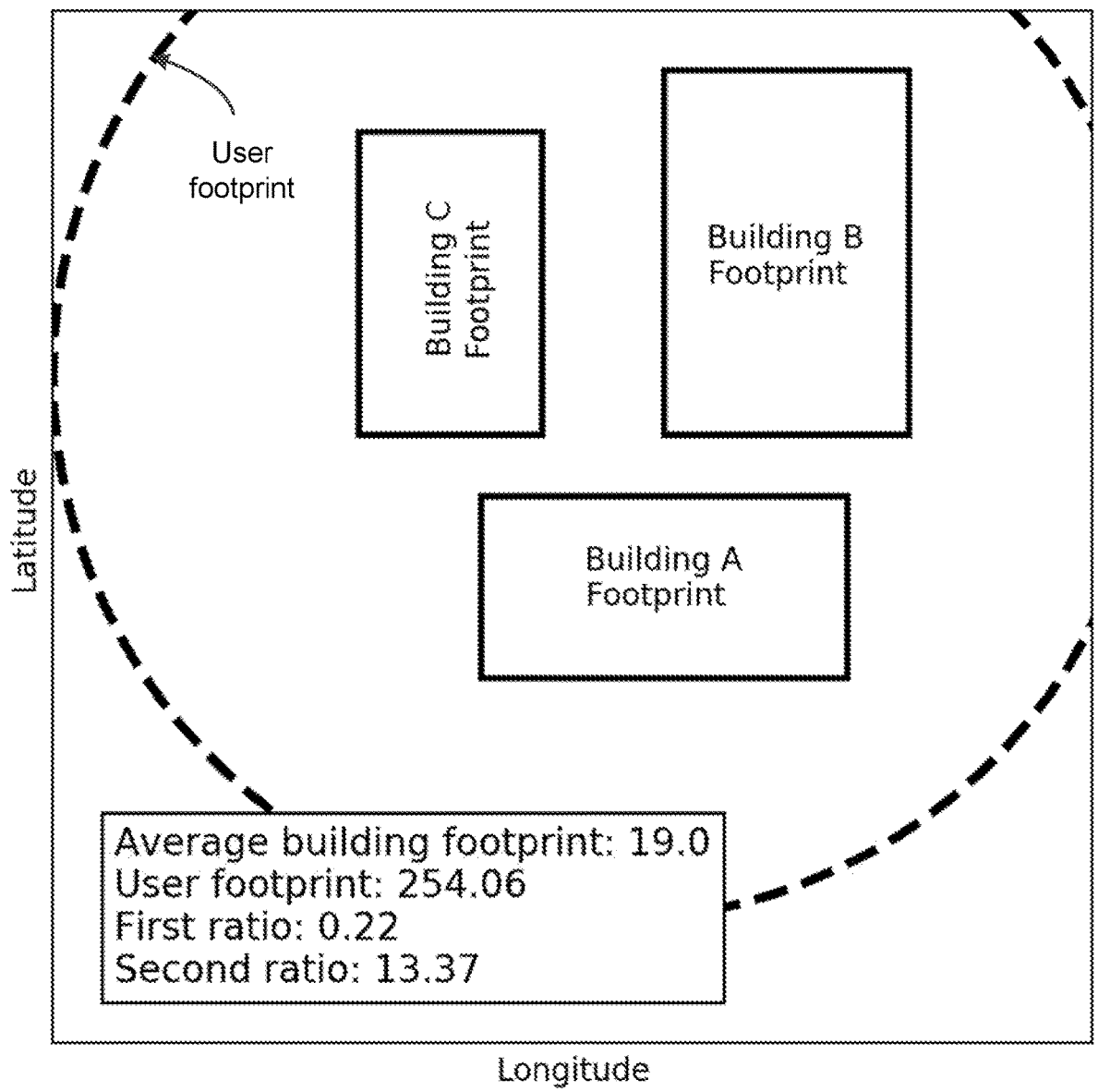
FIG. 9 illustrates a sub-process for determining that overlapping buildings are candidate buildings in which the mobile device may reside, but optionally designating the mobile device as being more likely outdoors than indoors, optionally designating the mobile device as being outdoors, or not optionally designating the mobile device as being indoors.

Sub-process 5: If the first ratio is determined to not exceed the first threshold value during step 434b, and the second ratio is determined to exceed the second threshold value during step 434c, a determination is made that the overlapping buildings are candidate buildings in which the mobile device may reside, and/or the mobile device is (i) designated as being more likely outdoors than indoors, (ii) designated as being outdoors, or (iii) at least not designated as being indoors during step 434d—e.g., as illustrated by FIG. 9, if the first ratio is less than the first threshold value (e.g., 0.22 is less than 0.5), and the second ratio is greater than the second threshold value (e.g., 13.37 is greater than 2), then the overlapping buildings (e.g., Building B and Building C) are possible locations of the mobile device, but the user location is not determined to be more-likely inside than to be outside (and may instead be determined to be more-likely outside than inside in some embodiments). If the first ratio indicates minimal overlap of possible positions with any building (e.g., 0.22<0.5), then the first ratio indicates that mobile device is more likely to be outside than inside because the possible positions of the mobile device (from the user footprint) are more likely to be outside than inside (e.g., an 22% chance the mobile device is inside). However, since the second ratio indicates that the user footprint is much larger than the average building footprint (e.g., 13.37>>2.0), a conclusion of being outside due to the first ratio is less certain than in sub-process 3 given the greater uncertainty of possible positions (i.e., less confident, coarser estimates of possible positions of the mobile device due to the larger footprint size). Thus, there are more possibilities for designating the likely position of the mobile device. Step 434a need not be performed when sub-process 5 is performed, but can be performed in some embodiments.

In some implementations (e.g., such as the process related to sensor calibration described later), knowledge of candidate buildings from sub-processes 3 through 5 can be used to determine if a pressure sensor of the mobile device can be calibrated even when the exact location of the mobile device (e.g., outside, or inside one of the candidate buildings) is unknown.

Calibrating a pressure sensor of a mobile device based on a determined indoor or outdoor location of the mobile device Different approaches for estimating an altitude of a mobile device (e.g., the mobile device 120 of FIG. 1) exist in the art. In a barometric-based positioning system, altitude can be computed using a measurement of pressure from a pressure sensor of a mobile device along with ambient pressure measurement(s) from a network of calibrated reference pressure sensors and a measurement of ambient temperature from the network or other source. An estimate of an altitude of a mobile device ($h_{mobile}$) can be computed by the mobile device, a server, or another machine that receives needed information as follows:

$$h_{mobile} = h_{sensor} - \frac{RT}{gM} \ln\left(\frac{P_{sensor}}{P_{mobile}}\right), \quad \text{(Equation 3)}$$

where $P_{mobile}$ is the estimate of pressure that is accurate to within a tolerated amount of pressure from true pressure (e.g., less than 5 Pa) at the location of the mobile device as measured by a pressure sensor of the mobile device, $P_{sensor}$ is an estimate of pressure that is accurate to within a tolerated amount of pressure from true pressure (e.g., less than 5 Pa) at the location of a reference pressure sensor, T is an estimate of temperature (e.g., in Kelvin) at the location of the reference pressure sensor or a different location of a remote temperature sensor, $h_{sensor}$ is an estimated altitude of the reference pressure sensor that is estimated to within a desired amount of altitude error (e.g., less than 1.0 meters), g corresponds to acceleration due to gravity, R is a gas constant, and M is molar mass of air (e.g., dry air or other air). The minus sign (−) may be substituted with a plus sign (+) in alternative embodiments of Equation 3, as would be understood by one of ordinary skill in the art (e.g., depending on how the gravitational constant g is defined as a positive or negative number, such as 9.8 or −9.8 m/s².). The estimate of pressure at the location of the reference pressure sensor can be converted to an estimated reference-level pressure that corresponds to the reference pressure sensor in that it specifies an estimate of pressure at the latitude and longitude of the reference pressure sensor, but at a reference-level altitude that likely differs from the altitude of the reference pressure sensor.

The reference-level pressure can be estimated as follows:

$$P_{ref} = P_{sensor} \times \exp\left(-\frac{gM(h_{ref} - h_{sensor})}{RT}\right), \quad \text{(Equation 4)}$$

where $P_{sensor}$ is the estimate of pressure at the location of the reference pressure sensor, $P_{ref}$ is the reference-level pressure estimate, and $h_{ref}$ is the reference-level altitude. The altitude of the mobile device $h_{mobile}$ can be computed using Equation 3, where $h_{ref}$ is substituted for $h_{sensor}$ and $P_{ref}$ is substituted for $P_{sensor}$ as follows:

$$h_{mobile} = h_{ref} - \frac{RT}{gM}\ln\left(\frac{P_{ref}}{P_{mobile}}\right). \quad \text{(Equation 5)}$$

The reference-level altitude $h_{ref}$ may be any altitude and can be set at mean sea-level (MSL). When two or more reference-level pressure estimates are available, the reference-level pressure estimates are combined into a single reference-level pressure estimate value (e.g., using an average, weighted average, or other suitable combination of the reference pressures), and the single reference-level pressure estimate value is used for the reference-level pressure estimate $P_{ref}$.

The pressure sensor of the mobile device is typically inexpensive and susceptible to drift over time. Consequently, the pressure sensor of the mobile device must be frequently calibrated to ensure measurements of pressure at the altitude of the mobile device have accuracy needed for accurate estimates of the mobile device's altitude. A typical approach for calibrating a pressure sensor of a mobile device determines a calibration adjustment (C) that, when applied to a measurement of pressure by the pressure sensor ($P_{mobile}$), results in an estimated altitude ($h_{mobile}$) that is within a tolerated amount of distance from the true altitude at which a mobile device resides ($h_{truth}$). One such approach uses the following formula to solve for the calibration adjustment (C) where:

$$h_{truth} = h_{ref} - \frac{RT}{gM}\ln\left(\frac{P_{ref}}{P_{mobile} + C}\right). \quad \text{(Equation 6)}$$

Alternatively, the left and right sides of Equation 6 need not be equal, and instead need only be within a tolerated amount of altitude from each other, such as 1 to 2 meters.

Differentiating pressure with respect to height can be used to help determine the calibration value (C), and the following relationship $$P_{at\,h_1} = P_{at\,h_2}\exp\left(\frac{gM(h_2 - h_1)}{RT}\right) \quad \text{(Equation 7)}$$

can be used to derive the following formula $$\frac{dP}{dh} = \frac{gMP}{RT} \approx 0.034\frac{P}{T}, \quad \text{(Equation 8)}$$

where P refers to pressure experienced by the mobile device since the ratio illustrates pressure change (ΔP) for a corresponding change in height (Δh) in relation to locations of the mobile device. Thus, the calibration value (C) can be determined as shown below:

$$C = (h_{truth} - h_{phone}) \times \frac{dP}{dh}. \quad \text{(Equation 9)}$$

Knowledge of the true altitude ($h_{truth}$) at which a mobile device resides to within a threshold amount of altitude (e.g., 1 to 2 meters) is critical for calibrating the pressure sensor of the mobile device, since the usefulness of calibration over time is limited when the true altitude of the mobile device cannot be ascertained to within the threshold amount of altitude. Under some circumstances, the true altitude can be determined as (i) a known altitude of ground terrain at which the mobile device is determined to reside while outside or (ii) a known altitude of a particular floor of a building at which the mobile device is determined to reside while inside that building, both adjusted by an assumed height at which the mobile device is positioned above the terrain or floor, such as 1 meter (e.g., when typically carried in a pocket or a bag, when on a table or desk, or when held by a user). This assumed height is believed to be a common height at which a mobile device is located above a floor, but any other height can be used as desired. However, many approaches for determining true altitude are not always able to detect when the mobile device is at a known altitude of particular ground terrain or a particular floor compared to being on an unknown floor within a range of floors inside a building. Since many mobile devices are used in urban environments with many outdoor areas with known altitudes that are closely located to indoor areas with different possible altitudes at which mobile devices can reside, determining whether mobiles devices are inside building(s) or outside is critical for calibrating pressure sensors of those mobile devices so as to ensure estimated altitudes of those mobile devices have desired levels of accuracy. The previously-described process of FIG. 2 for determining if a mobile device is inside or outside one or more buildings can be used to constrain candidate locations of the mobile device, and the altitudes of these candidate locations can be used to determine a representative altitude value used for the assumed true altitude of the mobile device ($h_{truth}$) under certain conditions, as discussed further below.

In particular, information from a building database (e.g., floor-level altitudes) or a terrain database (e.g., ground-level altitudes) can be used to constrain the likely representative altitude of the mobile device for use as $h_{truth}$ in determining a calibration value (C) that is used to adjust estimates of pressure from the pressure sensor of the mobile device. If the user footprint of the mobile device occupies an area of altitudes that do not vary more than a threshold amount of altitude (e.g., 1 meter), then some combination of the altitudes in that area can be used as the representative altitude of the mobile device during calibration of that mobile device's pressure sensor. For example, if all floors of all candidate buildings in which the mobile device may reside only include ground-level floors with altitudes that are within the threshold amount of altitude from each other, then a combination of the altitudes of the ground-level floors can be used as the representative altitude of the mobile device (which may be optionally adjusted by a typical height above a floor at which the mobile device is assumed to be positioned). By way of another example, if the ratio of single-story candidate buildings to all candidate buildings is above a threshold (e.g. 80%), then a combination of the altitudes of the ground-level floors from all single-story candidate buildings can be used as the representative altitude of the mobile device. The altitudes of the ground-level floors can be looked up from a database of floor altitudes or can be assumed to match an altitude of ground terrain at each of the buildings as determined from a terrain database. The altitudes of the ground-level floors may be optionally adjusted by a typical height above a floor at which the mobile device is assumed to be positioned.

Figure 10:
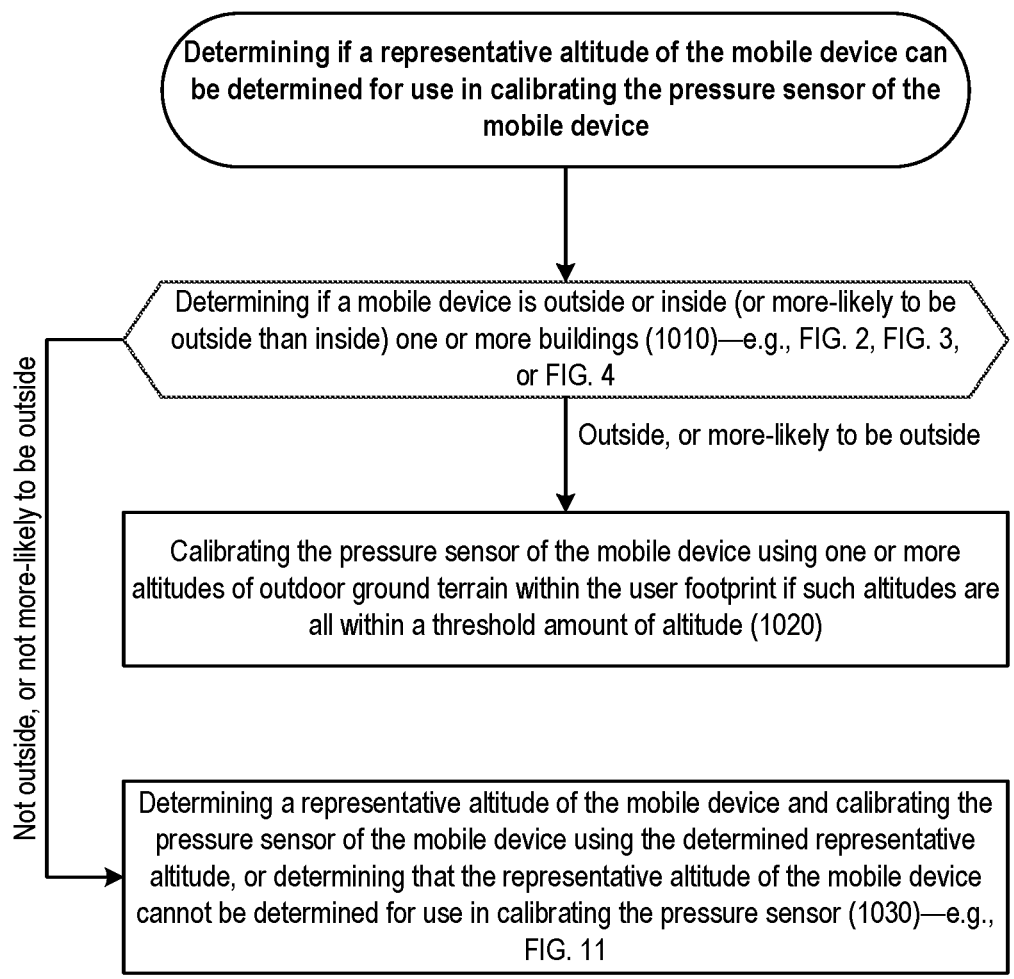
FIG. 10 shows a process for determining if a representative altitude of a mobile device can be determined for use in calibrating a pressure sensor of the mobile device.

By way of example, FIG. 10 shows a process for determining if a representative altitude of the mobile device can be determined for use in calibrating the pressure sensor of the mobile device.

A determination is made as to whether a mobile device is outside or inside one or more buildings, or more-likely to be outside than inside (1010)—e.g., using the processes of FIG. 2, FIG. 3, or FIG. 4 to determine that (i) the mobile device does not reside inside any building (e.g., is outside or is more-likely to be outside than inside), (ii) the mobile device resides inside a particular building from the identified buildings (e.g., is not outside a particular building or is not more-likely to be outside than inside a particular building), or (iii) that one or more of the identified buildings are candidate buildings in which the mobile device may reside (e.g., is not outside or is not more-likely to be outside than inside). In different embodiments of step 1010, a determination is made as to whether the mobile device's location is any: of (i), (ii) or (iii); (i) or (ii); (i) or (iii); (ii) or (iii); (i); (ii); or (iii).

If a determination is made that the mobile device is outside or more-likely to be outside than inside one or more buildings, the pressure sensor of the mobile device is calibrated using one or more altitudes of outdoor ground terrain within the user footprint if such altitudes are all within the threshold amount of altitude (e.g., 1 meter) (1020). In one embodiment, step 1020 is performed by any suitable machine, such as a processor of the mobile device or a server, which retrieves the one or more altitudes from a terrain database, determines if those altitudes are within the threshold amount of altitude, and if so, determines a representative altitude based on the one or more altitudes (e.g., a selected altitude at an estimated position of the mobile device or other location inside the user footprint, an average of those altitudes, a median of those altitudes, or another combination of those altitudes). In an alternative implementation, if a particular building in which the mobile device may reside is not identified during step 1010, or no candidate buildings in which the mobile device may reside are identified during step 1010, the pressure sensor of the mobile device is not calibrated (e.g., since the absence of identified buildings in which the mobile device may reside could have resulted from the building database lacking information associated with a building that is partially or entirely within the user footprint, and not because the mobile device is outside).

If a determination is made that the mobile device is not outside or is not more-likely to be outside than inside (e.g., the mobile device resides inside a particular building from the identified buildings or that one or more of the identified buildings are determined to be candidate buildings in which the mobile device may reside during step 1010), (i) a representative altitude of the mobile device is determined and the pressure sensor of the mobile device is optionally calibrated using the determined representative altitude, or (ii) a determination is made that the representative altitude of the mobile device cannot be determined and the pressure sensor of the mobile device is optionally not calibrated due to lack of a representative altitude (1030). In one embodiment, step 1030 is performed by any suitable machine, such as a processor of the mobile device or a server. One implementation of step 1030 is shown in FIG. 11 and described below.

Figure 11:
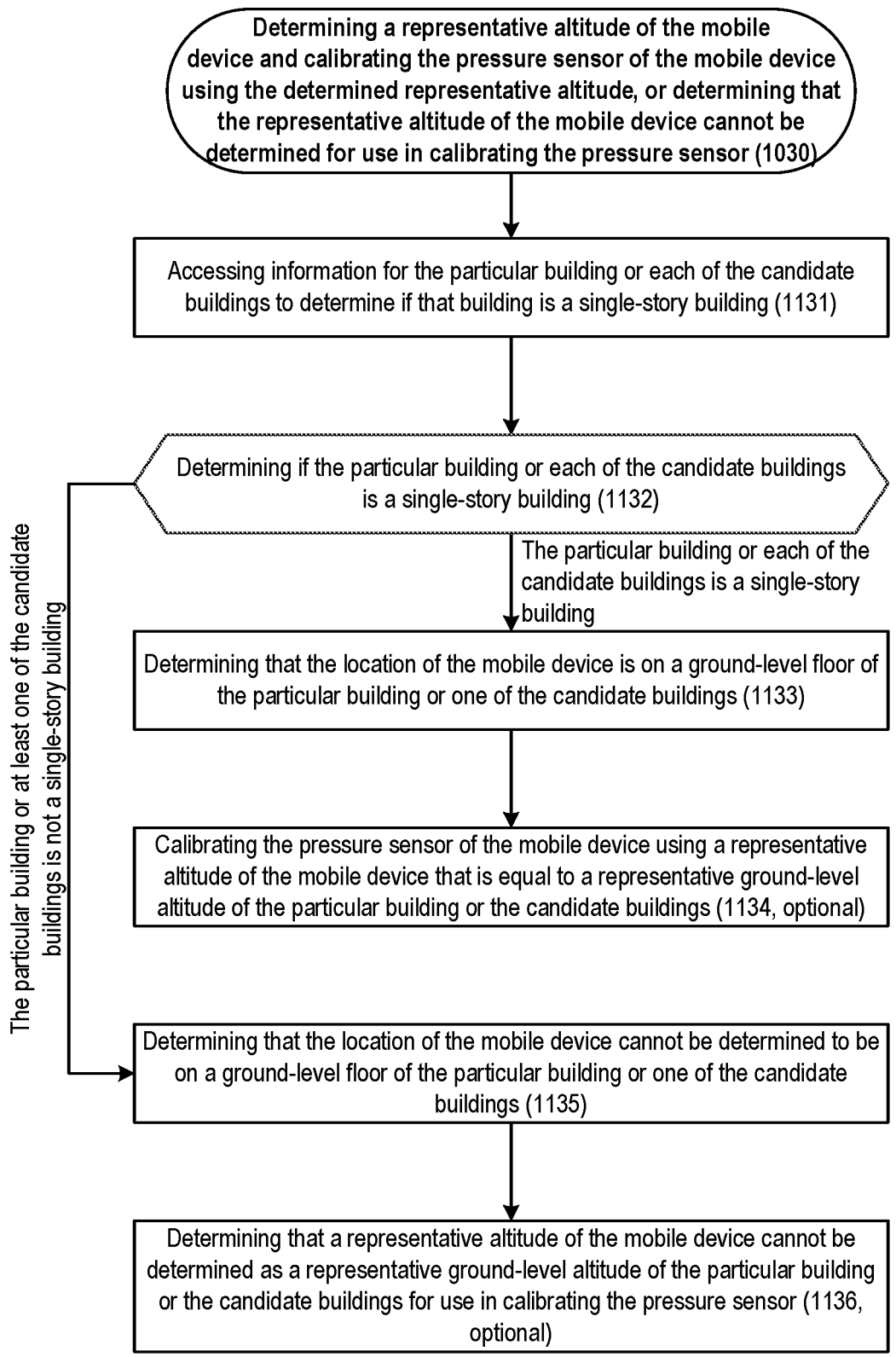
FIG. 11 shows a process for determining a representative altitude of a mobile device, or for determining that the representative altitude of the mobile device cannot be determined.

As shown in FIG. 11, information for the particular building or for each of the candidate building(s) is accessed from a building database to determine if that building is a single-story building (e.g., a building having only a ground-level floor or having a ground-level floor that is the only floor accessible to the mobile device) or not a single-story building (e.g., a building having more than one floor or having a non-ground-level floor accessible to the mobile device) (1131). The information will depend on whether the particular building is specified during step 1010, or whether the candidate buildings are specified during step 1010.

Accessing the information may be achieved using known techniques (e.g., generating a request for the information that identifies the building and the desired information, sending the request to the database, and receiving the information from the database). Examples of accessed information for each building may include a number of floors in that building (e.g., where only 1 floor indicates a single-story building, and more than 1 floor indicates a building is not a single story building), heights for each floor in that building, a height or altitude to the top of the building, or other information specifying whether that building is or is not a single-story building.

In a first embodiment of step 1131, for each specified building (e.g., the particular building or each of the candidate buildings), each floor height and/or floor label (e.g., "floor 1", . . . "floor N") for the building is retrieved from the building database, and a determination is made as to whether the one or more retrieved floor heights and/or floor labels specify only a ground-level floor height and/or a ground-level floor, or more than one floor height and/or more than one floor. If the one or more retrieved floor heights and/or floor labels specify only a ground-level floor height and/or floor (e.g., a single floor height, or only a single floor number), the specified building is designated as a single-story building. If the one or more retrieved floor heights and/or floor labels specify more than one floor height and/or floor (e.g., multiple floor heights, or multiple floor numbers), the specified building is designated as a multi-story building or not a single-story building. The single-story/not single-story designation for each building is stored as data associated with that building (e.g., stored in local memory of the mobile device or a server, or stored in the building database for future retrieval).

In a second embodiment of step 1131, for each specified building (e.g., the particular building or each of the candidate buildings), a height or altitude of the building is retrieved from the building database, and a determination is made as to whether the height or altitude indicates the specified building is more likely to be a single-story building or not a single-story building (e.g., a multi-story building). If the height or altitude indicate the specified building is more likely to be a single-story building than not a single-story building, the specified building is designated as a single-story building. If the height or altitude indicate the specified building is more likely to not be a single-story building than a single-story building, the specified building is designated as a multi-story building or not a single-story building.

In one implementation of the second embodiment, the retrieved height or altitude of a building is compared to a threshold maximum height (e.g., 3, 6 or another number of meters) or a threshold maximum altitude (e.g., 3, 6 or another number of meters above a ground-level altitude in the vicinity of the building) to determine if the retrieved height or altitude is less than, equal to, or greater than the threshold maximum height or the threshold maximum altitude, respectively. A determination is made that the building is more likely to be a single-story building than not a single-story building when the retrieved height or altitude is respectively less than or equal to the threshold maximum height or the threshold maximum altitude, and a determination is made that the building is more likely to not be a single-story building than a single-story building when the retrieved height or altitude is respectively greater than the threshold maximum height or the threshold maximum altitude. The threshold maximum height or maximum altitude can be based on different factors, including building codes for heights of buildings, average building heights, or other considerations.

In another implementation of the second embodiment, the retrieved height or altitude of a building is compared to a threshold maximum height (e.g., 3, 6 or another number of meters) or a threshold maximum altitude (e.g., 3, 6 or another number of meters above a ground level altitude in the vicinity of the building) to determine if the retrieved height or altitude is less than, equal to, or greater than the threshold maximum height or the threshold maximum altitude, respectively. If the retrieved height or altitude is respectively greater than the threshold maximum height or the threshold maximum altitude, a determination is made that the building is more likely to not be a single-story building than a single-story building. If the retrieved height or altitude is respectively less than or equal to the threshold maximum height or the threshold maximum altitude, a determination is made as to whether the building is located in a region where below-ground-level floors are uncommon—e.g., due to seismic activity (e.g., California), water table restrictions (e.g., Louisiana), or another discernable characteristic of the region in which the building is located. A determination is made that the building is more likely to be a single-story building than not a single-story building when the building is located in a region where below-ground-level floors are uncommon. A determination is made that the building is no more likely to be a single-story building than not a single-story building, or that the building is possibly a single-story building, when the building is located in a region where below-ground-level floors are common.

By way of example, the single-story/not single-story/ possibly a single-story building designation for each building can be stored as data associated with that building (e.g., stored in local memory of the mobile device or a server, or stored in the building database for later retrieval). In a third embodiment of step 1131, if single-story/not single-story designations for specified buildings are already stored in the database, those designations can be accessed from the database using known techniques, and then used for the determination in step 1131.

A determination is made as to whether the particular building or each of the candidate buildings is a single-story building by retrieving the single-story/not single-story designation for that building (1132).

If the designation for the particular building or each candidate building specifies that building is a single-story building, the location of the mobile device is determined to be on a ground-level floor of the particular building or an unknown building of the candidate buildings (1133), and the pressure sensor of the mobile device is optionally calibrated using a representative altitude of the mobile device that is equal to a representative ground-level altitude of the particular building or the candidate buildings adjusted upward by a typical height above the floor at which the mobile device is likely to reside (1134, optional).

Alternatively, if the designation for each candidate building in a threshold amount (e.g., 80%) of the candidate buildings specifies that building as being a single-story building, the location of the mobile device is determined to be on a ground-level floor of an unknown building of the candidate buildings (1133), and the pressure sensor of the mobile device is optionally calibrated using a representative altitude of the mobile device that is equal to a representative ground-level altitude of the particular building or the candidate buildings adjusted upward by a typical height above the floor at which the mobile device is likely to reside (1134, optional). One implementation of this alternative embodiment includes steps of determining (e.g., setting, selecting, looking up) the threshold amount, and then determining if the candidate buildings include the threshold amount of candidate buildings that are single-story.

Alternatively, instead of evaluating a threshold amount of single-story v. non-single-story buildings, the possible floors or floor sizes for all candidate buildings may be counted, which is akin to calculating a population distribution spread equally across multiple floors of multiple buildings. The number of floors in each candidate building may be determined using known approaches for doing so, and a total number of floors in all candidate buildings may be determined by summing the numbers of floors determined for the candidate buildings. A ground-level floor ratio can be determined by dividing the number of ground-level floors in all candidate buildings by the total number of floors in the candidate buildings—e.g., if the number of floors in building A=1, if the number of floors in building B=2 and if the number of floors in building C=1, then there are two single-story buildings and one two-story building, which means there are 3 ground-level floors and 1 non-ground level floor, so the ground-level floor ratio is ¾, or 0.75. If the ground-level floor ratio is greater than a threshold floor ratio amount (e.g., 0.67), the location of the mobile device is determined to be on a ground-level floor of an unknown building of the candidate buildings (1133). Alternatively, each floor number can be weighted by the footprint area of that floor—e.g., if each floor in building A has a footprint size of 50 m^2, each floor in building B has a footprint size of 100 m^2, and each floor in building C has a footprint size of 25 m^2, then the ground-floor ratio is (50*1+100*1+25*1)/(50*1+100*2+25*1)=0.64, which is not greater than the threshold floor ratio amount of 0.67, and therefore a combination of ground-level altitudes cannot be used. Any threshold floor ratio can be used.

If the designation of the particular building, any of the candidate buildings, or more than a threshold number of candidate buildings (e.g., 20%) specifies that candidate building as not a single-story building, a determination is made that the location of the mobile device cannot be determined to be on a ground-level floor of the particular building or an unknown building of the candidate buildings (1135), which optionally precludes calibrating the pressure sensor of the mobile device using a representative ground-level altitude of the particular building or the candidate buildings to determine a representative altitude (1136, optional).

A representative ground-level altitude of the particular building or candidate buildings can be determined in different ways. By way of a first example, when a determination is made that there is only one candidate building or when the particular building is specified during step 1010, the representative ground-level altitude is the ground-level altitude of that candidate building or the particular building as retrieved from a building database or an altitude of ground-level terrain at or in the vicinity of (e.g., within a predefined distance of any desired length of) that building as retrieved from a terrain database. By way of a second example, ground-level floor altitudes of the candidate buildings are retrieved from the building database or one or more ground-terrain altitudes in the vicinity of the candidate buildings are retrieved from a terrain database, and an average, a median or another combination of the retrieved altitudes is used as the representative ground-level altitude. By way of a third example, a distribution of retrieved ground-level floor altitudes of the candidate buildings or ground-terrain altitudes in the vicinity of the candidate buildings is determined, and if a given percentage (e.g., 67%, 100%, other) of the distributed altitudes are within an altitude difference threshold of each other (e.g., 1 meter of each other), then the representative ground-level altitude of the candidate buildings is set to a combination of some or all of the distributed altitudes (e.g., a mean or median of all of the distributed altitudes or of only the given percentage of distributed altitudes that are within the altitude difference threshold from each other) optionally adjusted upward by an assumed height above a floor at which the mobile device is likely to be positioned. If the given percentage of the distributed altitudes are not within the altitude difference threshold of each other, the representative ground-level altitude is designated as indeterminable or is determined using another approach.

The processes disclosed herein for determining if a mobile device is outside, inside a building, and/or at a ground-level floor of a candidate building do not need to be exclusively used to determine representative altitudes for use in calibrating a pressure sensor of a mobile device. Other uses are contemplated, including detecting if a mobile device is outside (e.g., to improve emergency response times by reducing the search area in which the mobile device resides, or to collect and store information about the outside area for later use in different applications that are known in the art), and/or detecting if a mobile device is inside a particular building (e.g., to improve emergency response times by reducing the search area in which the mobile device resides, to identify and retrieve particular information about that building such as a building map or information used to resolve a floor level at which the mobile device is located or other information, or to collect and store information about that building for later use in different applications that are known in the art).

Technical Benefits

Mobile devices are routinely used to estimate two or three-dimensional positions of their users in different environments. Unfortunately, limitations in the functionality of positioning networks can impact the accuracy of estimated positions as being outside or inside, which impairs different uses of such estimated positions (e.g., emergency response, navigation, collection and distribution of information about buildings, and other uses). Functional limitations of the positioning networks include uncertainty as to where a mobile device is likely to reside within what can be a significantly large user footprint. Improvements to the functionality of positioning networks in support of better estimates of possible positions of a mobile device is highly desirable, and the processes described herein include concrete and particular ways in which the functionality of positioning networks is improved to allow for better estimates of possible positions (e.g., fewer possible positions or more accurate possible positions) under circumstances when prior approaches could not make the same determinations. The resultant estimates of possible positions include new and useful data, including a reduced number of possible positions that occupy a smaller area than the user footprint, or may include a conclusion that the mobile device is outside or inside a particular building, or may include a conclusion that the mobile device is inside an unknown single-story building from among a plurality of buildings with different numbers of floors in an environment.

Mobile devices are also routinely used to estimate altitudes of their users in different environments. Highly-accurate estimated altitudes of mobile devices are typically based on (i) reference pressures from a network of reference pressure sensors and (ii) measurements of pressure from pressure sensors of the mobile devices. Unfortunately, limitations in the functionality of the pressure sensor of the mobile device can impact the accuracy of estimated altitudes, which impairs different uses of the estimated altitudes (e.g., emergency response, navigation, collection and distribution of floor-level information, and other uses). Functional limitations of the pressure sensor of the mobile device include sensor drift. Calibration for sensor drift is critical for accurate estimates of the mobile device's altitude. Improvements to the functionality of the pressure sensor of the mobile device in support of better (e.g., more reliable) altitude estimates is highly desirable, and the processes described herein include concrete and particular ways in which the functionality of the pressure sensor of the mobile device is improved by identifying more opportunities to calibrate the pressure sensor of the mobile device to allow for better altitude estimates.

Other Aspects

Various "designations" are mentioned in this disclosure. Each designation is generated and stored as data specifying the subject of the designation. Storage may be in local memory of a mobile device or a server, or stored in a building database for later retrieval.

Any method (also referred to as a "process" or an "approach") described or otherwise enabled by disclosure herein may be implemented by hardware components (e.g., machines), software modules (e.g., stored in machine-readable media), or a combination thereof. By way of example, machines may include one or more computing device(s), processor(s), controller(s), integrated circuit(s), chip(s), system(s) on a chip, server(s), programmable logic device(s), field programmable gate array(s), electronic device(s), special purpose circuitry, and/or other suitable device(s) described herein or otherwise known in the art. One or more non-transitory machine-readable media embodying program instructions that, when executed by one or more machines, cause the one or more machines to perform or implement operations comprising the steps of any of the methods described herein are contemplated herein. As used herein, machine-readable media includes all forms of machine-readable media (e.g. one or more non-volatile or volatile storage media, removable or non-removable media, integrated circuit media, magnetic storage media, optical storage media, or any other storage media, including RAM, ROM, and EEPROM) that may be patented under the laws of the jurisdiction in which this application is filed, but does not include machine-readable media that cannot be patented under the laws of the jurisdiction in which this application is filed. Systems that include one or more machines and one or more non-transitory machine-readable media are also contemplated herein. One or more machines that perform or implement, or are configured, operable or adapted to perform or implement operations comprising the steps of any methods described herein are also contemplated herein. Method steps described herein may be order independent and can be performed in parallel or in an order different from that described if possible to do so. Different method steps described herein can be combined to form any number of methods, as would be understood by one of ordinary skill in the art. Any method step or feature disclosed herein may be omitted from a claim for any reason. Certain well-known structures and devices are not shown in figures to avoid obscuring the concepts of the present disclosure. When two things are "coupled to" each other, those two things may be directly connected together, or separated by one or more intervening things. Where no lines or intervening things connect two particular things, coupling of those things is contemplated in at least one embodiment unless otherwise stated. Where an output of one thing and an input of another thing are coupled to each other, information sent from the output is received in its outputted form or a modified version thereof by the input even if the information passes through one or more intermediate things. Any known communication pathways and protocols may be used to transmit information (e.g., data, commands, signals, bits, symbols, chips, and the like) disclosed herein unless otherwise stated. The words comprise, comprising, include, including and the like are to be construed in an inclusive sense (i.e., not limited to) as opposed to an exclusive sense (i.e., consisting only of). Words using the singular or plural number also include the plural or singular number, respectively, unless otherwise stated. The word "or" and the word "and" as used in the Detailed Description cover any of the items and all of the items in a list unless otherwise stated. The words some, any and at least one refer to one or more. The terms may or can are used herein to indicate an example, not a requirement—e.g., a thing that may or can perform an operation, or may or can have a characteristic, need not perform that operation or have that characteristic in each embodiment, but that thing performs that operation or has that characteristic in at least one embodiment.

Figure 12:
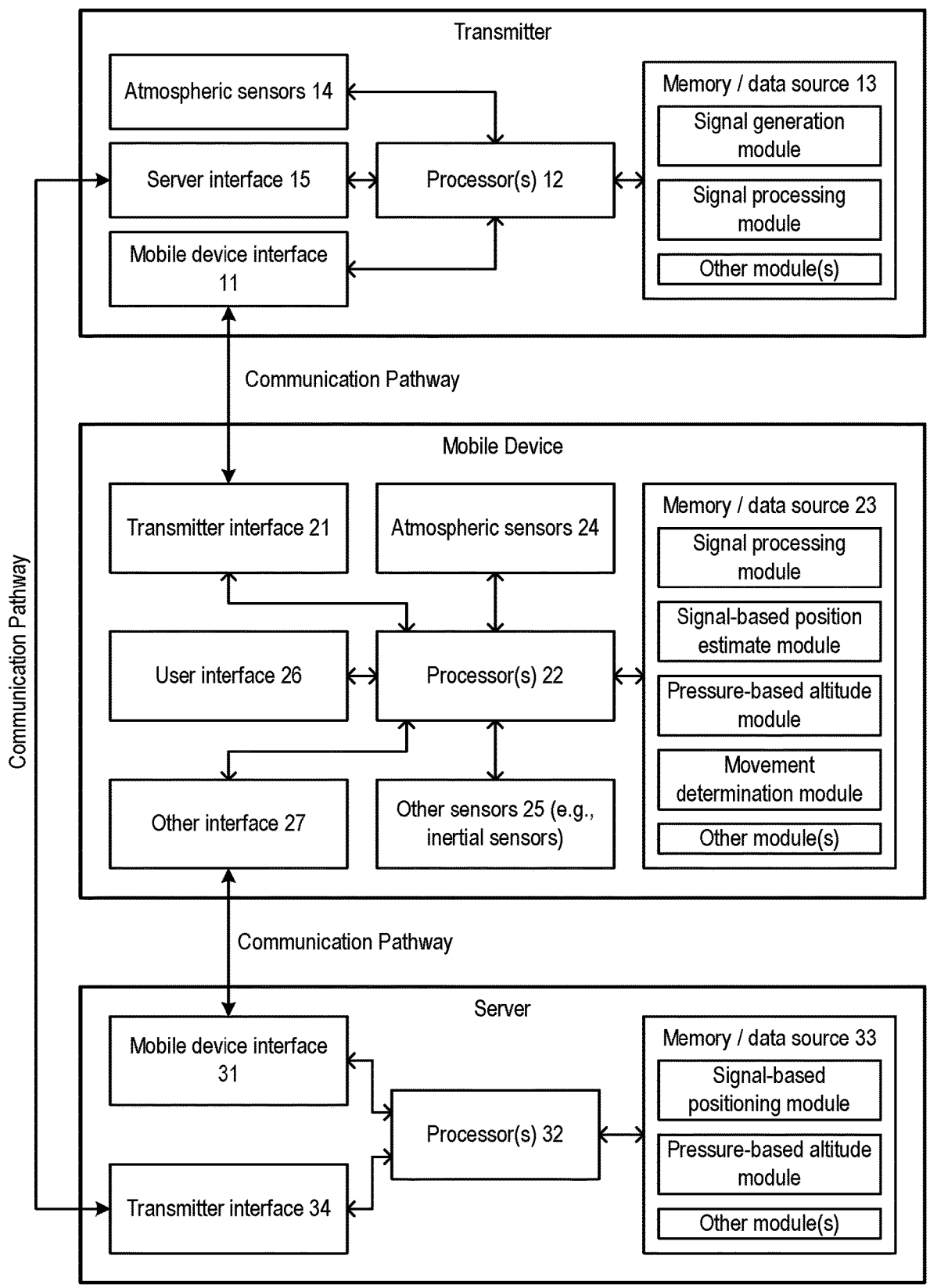
FIG. 12 illustrates components of a transmitter, a mobile device, and a server.

FIG. 12 illustrates components of a transmitter, a mobile device, and a server. Examples of communication pathways are shown by arrows between components.

By way of example in FIG. 12, each of the transmitters may include: a mobile device interface 11 for exchanging information with a mobile device (e.g., an antenna and RF front end components known in the art or otherwise disclosed herein); one or more processor(s) 12; memory/data source 13 for providing storage and retrieval of information and/or program instructions; atmospheric sensor(s) 14 for measuring environmental conditions (e.g., pressure, temperature, other) at or near the transmitter; a server interface 15 for exchanging information with a server (e.g., an antenna, a network interface, or other); and any other components known to one of ordinary skill in the art. The memory/data source 13 may include memory storing software modules with executable instructions, and the processor(s) 12 may perform different actions by executing the instructions from the modules, including: (i) performance of part or all of the methods as described herein or otherwise understood by one of skill in the art as being performable at the transmitter; (ii) generation of positioning signals for transmission using a selected time, frequency, code, and/or phase; (iii) processing of signaling received from the mobile device or other source; or (iv) other processing as required by operations described in this disclosure. Signals generated and transmitted by a transmitter may carry different information that, once determined by a mobile device or a server, may identify the following: the transmitter; the transmitter's position; environmental conditions at or near the transmitter; and/or other information known in the art. The atmospheric sensor(s) 14 may be integral with the transmitter, or separate from the transmitter and either co-located with the transmitter or located in the vicinity of the transmitter (e.g., within a threshold amount of distance).

By way of example FIG. 12, the mobile device may include: a transmitter interface 21 for exchanging information with a transmitter (e.g., an antenna and RF front end components known in the art or otherwise disclosed herein); one or more processor(s) 22; memory/data source 23 for providing storage and retrieval of information and/or program instructions; atmospheric sensor(s) 24 for measuring environmental conditions (e.g., pressure, temperature, other) at the mobile device; other sensor(s) 25 for measuring other conditions (e.g., inertial sensors for measuring movement and orientation); a user interface 26 (e.g., display, keyboard, microphone, speaker, other) for permitting a user to provide inputs and receive outputs; another interface 27 for exchanging information with the server or other devices external to the mobile device (e.g., an antenna, a network interface, or other); and any other components known to one of ordinary skill in the art. A GNSS interface and processing unit (not shown) are contemplated, which may be integrated with other components (e.g., the interface 21 and the processors 22) or a standalone antenna, RF front end, and processors dedicated to receiving and processing GNSS signaling. The memory/data source 23 may include memory storing software modules with executable instructions, and the processor(s) 22 may perform different actions by executing the instructions from the modules, including: (i) performance of part or all of the methods as described herein or otherwise understood by one of ordinary skill in the art as being performable at the mobile device; (ii) estimation of an altitude of the mobile device based on measurements of pressure form the mobile device and transmitter(s), temperature measurement(s) from the transmitter(s) or another source, and any other information needed for the computation); (iii) processing of received signals to determine position information (e.g., times of arrival or travel time of the signals, pseudoranges between the mobile device and transmitters, transmitter atmospheric conditions, transmitter and/or locations or other transmitter information); (iv) use of position information to compute an estimated position of the mobile device; (v) determination of movement based on measurements from inertial sensors of the mobile device; (vi) GNSS signal processing; or (vii) other processing as required by operations described in this disclosure.

By way of example FIG. 12, the server may include: a mobile device interface 21 for exchanging information with a mobile device (e.g., an antenna, a network interface, or other); one or more processor(s) 32; memory/data source 33 for providing storage and retrieval of information and/or program instructions; a transmitter interface 34 for exchanging information with a transmitter (e.g., an antenna, a network interface, or other); and any other components known to one of ordinary skill in the art. The memory/data source 33 may include memory storing software modules with executable instructions, and the processor(s) 32 may perform different actions by executing instructions from the modules, including: (i) performance of part or all of the methods as described herein or otherwise understood by one of ordinary skill in the art as being performable at the server; (ii) estimation of an altitude of the mobile device; (iii) computation of an estimated position of the mobile device; or (iv) other processing as required by operations described in this disclosure. Steps performed by servers as described herein may also be performed on other machines that are remote from a mobile device, including computers of enterprises or any other suitable machine.

This application relates to the following related application(s): U.S. Pat. Appl. No. 62/713,476, filed 1 Aug. 2018, entitled SYSTEMS AND METHODS FOR DETERMINING AN INDOOR OR OUTDOOR LOCATION OF A MOBILE DEVICE AND CALIBRATING A PRESSURE SENSOR OF THE MOBILE DEVICE. The content of each of the related application(s) is hereby incorporated by reference herein in its entirety.

The invention claimed is:

1. A method for determining an indoor or outdoor location of a mobile device, wherein the method comprises:
   determining a user footprint;
   identifying each building with a building footprint that at least partially overlaps with the user footprint; and
   determining, based on the user footprint and the building footprints of the identified buildings, that (i) the mobile device does not reside inside any building, (ii) the mobile device resides inside a particular building from the identified buildings, or (iii) that one or more of the identified buildings are candidate buildings that include a building in which the mobile device resides,
   wherein determining, based on the user footprint and building footprints of the identified buildings, that (i) the mobile device does not reside inside any building, (ii) the mobile device resides inside a particular building from the identified buildings, or (iii) that one or more of the identified buildings are candidate buildings that include a building in which the mobile device resides comprises:
      determining an average building footprint of the building footprints of the identified buildings;
      determining a first ratio representing an amount of the user footprint that is occupied by the building footprints of the identified buildings;
      determining a second ratio representing a comparative size of the user footprint and the average building footprint; and
      determining, based on the value of the first ratio and the value of the second ratio, that (i) the mobile device does not reside inside any building, (ii) the mobile device resides inside a particular building from the identified buildings, or (iii) that one or more of the identified buildings are candidate buildings that include a building in which the mobile device resides.

2. The method of claim 1, wherein determining, based on the value of the first ratio and the value of the second ratio, that (i) the mobile device does not reside inside any building, (ii) the mobile device resides inside a particular building from the identified buildings, or (iii) that one or more of the identified buildings are candidate buildings that include a building in which the mobile device resides comprises:
   determining if the first ratio is zero;
   if the first ratio is not zero, determining a first relationship specifying if the first ratio is less than or greater than a first threshold value, and determining a second relationship specifying if the second ratio is less than or greater than a second threshold value; and
   determining, based on whether the first ratio is zero or based on the first and second relationships, that (i) the mobile device does not reside inside any building, (ii) the mobile device resides inside a particular building from the identified buildings, or (iii) that one or more of the identified buildings are candidate buildings that include a building in which the mobile device resides.

3. The method of claim 2, wherein determining, based on whether the first ratio is zero or based on the first and second relationships, that (i) the mobile device does not reside inside any building, (ii) the mobile device resides inside a particular building from the identified buildings, or (iii) that one or more of the identified buildings are candidate buildings that include a building in which the mobile device resides comprises:
   determining that the mobile device does not reside inside any building when the first ratio is zero;
   determining that the mobile device resides inside a building from the identified buildings with a building footprint that overlaps the user footprint more than any other building footprint of any other identified building when the first relationship specifies the first ratio is greater than the first threshold value, and the second relationship specifies the second ratio is not greater than the second threshold value; and
   determining that the identified buildings are candidate buildings that include a building in which the mobile device resides (i) when the first relationship specifies the first ratio is greater than the first threshold value, and the second relationship specifies the second ratio is greater than the second threshold value, (ii) when the first relationship specifies the first ratio is not greater than the first threshold value, and the second relationship specifies the second ratio is not greater than the second threshold value, or (iii) when the first relationship specifies the first ratio is not greater than the first threshold value, and the second relationship specifies the second ratio is greater than the second threshold value.

4. The method of claim 2, wherein determining, based on whether the first ratio is zero or based on the first and second relationships, that (i) the mobile device does not reside inside any building, (ii) the mobile device resides inside a particular building from the identified buildings, or (iii) that one or more of the identified buildings are candidate buildings that include a building in which the mobile device resides comprises:
 determining that the mobile device does not reside inside any building when the first ratio is zero.

5. The method of claim 2, wherein determining, based on whether the first ratio is zero or based on the first and second relationships, that (i) the mobile device does not reside inside any building, (ii) the mobile device resides inside a particular building from the identified buildings, or (iii) that one or more of the identified buildings are candidate buildings that include a building in which the mobile device resides comprises:
 determining that the mobile device resides inside a building from the identified buildings with a building footprint that overlaps the user footprint more than any other building footprint of any other identified building when the first relationship specifies the first ratio is greater than the first threshold value, and the second relationship specifies the second ratio is not greater than the second threshold value.

6. The method of claim 2, wherein determining, based on whether the first ratio is zero or based on the first and second relationships, that (i) the mobile device does not reside inside any building, (ii) the mobile device resides inside a particular building from the identified buildings, or (iii) that one or more of the identified buildings are candidate buildings that include a building in which the mobile device resides comprises:
 determining that the identified buildings are candidate buildings that include a building in which the mobile device resides (i) when the first relationship specifies the first ratio is greater than the first threshold value, and the second relationship specifies the second ratio is greater than the second threshold value, (ii) when the first relationship specifies the first ratio is not greater than the first threshold value, and the second relationship specifies the second ratio is not greater than the second threshold value, or (iii) when the first relationship specifies the first ratio is not greater than the first threshold value, and the second relationship specifies the second ratio is greater than the second threshold value.

7. The method of claim 2, wherein determining, based on whether the first ratio is zero or based on the first and second relationships, that (i) the mobile device does not reside inside any building, (ii) the mobile device resides inside a particular building from the identified buildings, or (iii) that one or more of the identified buildings are candidate buildings that include a building in which the mobile device resides comprises:
 determining that the mobile device does not reside inside any building when the first ratio is zero;
 determining that the mobile device resides inside a building from the identified buildings with a building footprint that overlaps the user footprint more than any other building footprint of any other identified building when the first relationship specifies the first ratio is greater than the first threshold value, and the second relationship specifies the second ratio is not greater than the second threshold value;
 determining that the mobile device resides inside one of the identified buildings when the first relationship specifies the first ratio is greater than the first threshold value, and the second relationship specifies the second ratio is greater than the second threshold value; and
 determining that the mobile device does not reside inside any building when (i) the first relationship specifies the first ratio is not greater than the first threshold value, and the second relationship specifies the second ratio is not greater than the second threshold value, or (ii) the first relationship specifies the first ratio is not greater than the first threshold value, and the second relationship specifies the second ratio is greater than the second threshold value.

8. The method of claim 2, wherein determining, based on whether the first ratio is zero or based on the first and second relationships, that (i) the mobile device does not reside inside any building, (ii) the mobile device resides inside a particular building from the identified buildings, or (iii) that one or more of the identified buildings are candidate buildings that include a building in which the mobile device resides comprises:
 determining that the mobile device resides inside one of the identified buildings when the first relationship specifies the first ratio is greater than the first threshold value, and the second relationship specifies the second ratio is greater than the second threshold value.

9. The method of claim 2, wherein determining, based on whether the first ratio is zero or based on the first and second relationships, that (i) the mobile device does not reside inside any building, (ii) the mobile device resides inside a particular building from the identified buildings, or (iii) that one or more of the identified buildings are candidate buildings that include a building in which the mobile device resides comprises:
 determining that the mobile device does not reside inside any building when (i) the first relationship specifies the first ratio is not greater than the first threshold value, and the second relationship specifies the second ratio is not greater than the second threshold value, or (ii) the first relationship specifies the first ratio is not greater than the first threshold value, and the second relationship specifies the second ratio is greater than the second threshold value.

10. A method for determining an indoor or outdoor location of a mobile device, wherein the method comprises:
 determining a user footprint;
 identifying each building with a building footprint that at least partially overlaps with the user footprint; and
 determining, based on the user footprint and the building footprints of the identified buildings, that (i) the mobile device does not reside inside any building, (ii) the mobile device resides inside a particular building from the identified buildings, or (iii) that one or more of the identified buildings are candidate buildings that include a building in which the mobile device resides;
 if the mobile device is determined to not reside inside any building, calibrating a pressure sensor of the mobile device using one or more altitudes of outdoor ground terrain within the user footprint if the one or more altitudes are all within a threshold amount of altitude from each other; and
 if the mobile device is determined to reside inside a particular building from the identified buildings or if one or more of the identified buildings are determined to be candidate buildings in which the mobile device resides, (i) determining a representative altitude of the mobile device and calibrating the pressure sensor of the mobile device using the determined representative altitude, or (ii) determining that the representative altitude of the mobile device cannot be determined for use in calibrating the pressure sensor, wherein when the mobile device is determined to reside inside a particular building from the identified buildings or when one or more of the identified buildings are determined to be candidate buildings in which the mobile device resides, (i) determining a representative altitude of the mobile device and calibrating the pressure sensor of the mobile device using the determined representative altitude, or (ii) determining that the representative altitude of the mobile device cannot be determined for use in calibrating the pressure sensor comprises:

accessing information for the particular building or for each of the candidate buildings to determine if that building is a single-story building;

determining if the particular building or each of the candidate buildings is a single-story building;

determining that the location of the mobile device is on a ground-level floor of the particular building and calibrating the pressure sensor of the mobile device using a representative altitude of the mobile device that is equal to a representative ground-level altitude of the particular building if the particular building is a single-story building, or determining that the location of the mobile device is on a ground-level floor of one of the candidate buildings and calibrating the pressure sensor of the mobile device using a representative altitude of the mobile device that is equal to a representative ground-level altitude of the candidate buildings if each of the candidate buildings is a single-story building or if a number of the candidate buildings that are single-story buildings exceeds a threshold amount; and determining that the location of the mobile device cannot be determined to be on a ground-level floor of the particular building and determining that a representative altitude of the mobile device cannot be determined as a representative ground-level altitude of the particular building for use in calibrating the pressure sensor if the particular building is not a single-story building, or determining that the location of the mobile device cannot be determined to be on a ground-level floor of one of the candidate buildings and determining that a representative altitude of the mobile device cannot be determined as a representative ground-level altitude of the candidate buildings for use in calibrating the pressure sensor if any of the candidate buildings is not a single-story building or if the number of the candidate buildings that are single-story buildings is less than the threshold amount.

11. The method of claim 10, wherein determining if the particular building or each of the candidate buildings is a single-story building comprises:

for the particular building or for each of the candidate buildings:

retrieving one or more floor heights or floor labels for that building from a database;

determining if the one or more retrieved floor heights or floor labels for that building specify (i) only a ground-level floor height or only a ground-level floor for that building or (ii) more than one floor height or more than one floor for that building;

if the one or more retrieved floor heights or floor labels for that building specify only a ground-level floor height or only a ground-level floor for that building, determining that building is a single-story building; and if the one or more retrieved floor heights or floor labels for that building specify more than one floor height or more than one floor for that building, determining that building is not a single-story building.

12. The method of claim 10, wherein determining if the particular building or each of the candidate buildings is a single-story building comprises:

for the particular building or for each of the candidate buildings:

retrieving a height or altitude for that building from a database;

determining if the height or altitude indicates that building is more likely to be a single-story building or to not be a single-story building;

if the height or altitude indicates that building is more likely to be a single-story building than to not be a single-story building, determining that building is a single-story building; and if the height or altitude indicates that building is more likely to not be a single-story building than to be a single-story building, determining that building is not a single-story building.

13. The method of claim 12, wherein determining if the height or altitude indicates that building is more likely to be a single-story building or to not be a single-story building comprises:

determining if the retrieved height of that building is greater than a threshold maximum height or determining if the retrieved altitude of that building is greater than a threshold maximum altitude;

if the retrieved height of that building is not greater than the threshold maximum height, determining that the height indicates that building is more likely to be a single-story building than to not be a single-story building, or if the retrieved altitude of that building is not greater than the threshold maximum altitude, determining that the altitude indicates that building is more likely to be a single-story building than not a single-story building; and if the retrieved height of that building is greater than the threshold maximum height, determining that the height indicates that building is more likely to not be a single-story building than to be a single-story building, or if the retrieved altitude of that building is greater than the threshold maximum altitude, determining that the altitude indicates that building is more likely to not be a single-story building than to be a single-story building.

14. The method of claim 10, wherein the location of the mobile device is determined to be on a ground-level floor of one of the candidate buildings and the pressure sensor of the mobile device is calibrated using a representative altitude of the mobile device that is equal to a representative ground-level altitude of the candidate buildings if each of the candidate buildings is a single-story building, and wherein the location of the mobile device cannot be determined to be on a ground-level floor of one of the candidate buildings and a representative altitude of the mobile device cannot be determined as a representative ground-level altitude of the candidate buildings for use in calibrating the pressure sensor if any of the candidate buildings is not a single-story building.

15. The method of claim 10, wherein the location of the mobile device is determined to be on a ground-level floor of one of the candidate buildings and the pressure sensor of the mobile device is calibrated using a representative altitude of the mobile device that is equal to a representative ground-level altitude of the candidate buildings if the number of the candidate buildings that are single-story buildings exceeds the threshold amount, and wherein the location of the mobile device cannot be determined to be on a ground-level floor of one of the candidate buildings and a representative altitude of the mobile device cannot be determined as a representative ground-level altitude of the candidate buildings for use in calibrating the pressure sensor if the number of the candidate buildings that are single-story buildings is less than the threshold amount.

16. One or more non-transitory machine-readable media embodying program instructions that, when executed by one or more machines, cause the one or more machines to implement a method for determining an indoor or outdoor location of a mobile device, wherein the method comprises:
determining a user footprint;
identifying each building with a building footprint that at least partially overlaps with the user footprint; and
determining, based on the user footprint and the building footprints of the identified buildings, that (i) the mobile device does not reside inside any building, (ii) the mobile device resides inside a particular building from the identified buildings, or (iii) that one or more of the identified buildings are candidate buildings that include a building in which the mobile device resides,
wherein determining, based on the user footprint and building footprints of the identified buildings, that (i) the mobile device does not reside inside any building, (ii) the mobile device resides inside a particular building from the identified buildings, or (iii) that one or more of the identified buildings are candidate buildings that include a building in which the mobile device resides comprises:
determining an average building footprint of the building footprints of the identified buildings;
determining a first ratio representing an amount of the user footprint that is occupied by the building footprints of the identified buildings;
determining a second ratio representing a comparative size of the user footprint and the average building footprint; and
determining, based on the value of the first ratio and the value of the second ratio, that (i) the mobile device does not reside inside any building, (ii) the mobile device resides inside a particular building from the identified buildings, or (iii) that one or more of the identified buildings are candidate buildings that include a building in which the mobile device resides.

17. The one or more non-transitory machine-readable media of claim 16, wherein determining, based on the value of the first ratio and the value of the second ratio, that (i) the mobile device does not reside inside any building, (ii) the mobile device resides inside a particular building from the identified buildings, or (iii) that one or more of the identified buildings are candidate buildings that include a building in which the mobile device resides comprises:
determining if the first ratio is zero;
if the first ratio is not zero, determining a first relationship specifying if the first ratio is less than or greater than a first threshold value, and determining a second relationship specifying if the second ratio is less than or greater than a second threshold value; and
determining, based on whether the first ratio is zero or based on the first and second relationships, that (i) the mobile device does not reside inside any building, (ii) the mobile device resides inside a particular building from the identified buildings, or (iii) that one or more of the identified buildings are candidate buildings that include a building in which the mobile device resides.

18. The one or more non-transitory machine-readable media of claim 17, wherein determining, based on whether the first ratio is zero or based on the first and second relationships, that (i) the mobile device does not reside inside any building, (ii) the mobile device resides inside a particular building from the identified buildings, or (iii) that one or more of the identified buildings are candidate buildings that include a building in which the mobile device resides comprises:
determining that the mobile device does not reside inside any building when the first ratio is zero;
determining that the mobile device resides inside a building from the identified buildings with a building footprint that overlaps the user footprint more than any other building footprint of any other identified building when the first relationship specifies the first ratio is greater than the first threshold value, and the second relationship specifies the second ratio is not greater than the second threshold value; and
determining that the identified buildings are candidate buildings that include a building in which the mobile device resides (i) when the first relationship specifies the first ratio is greater than the first threshold value, and the second relationship specifies the second ratio is greater than the second threshold value, (ii) when the first relationship specifies the first ratio is not greater than the first threshold value, and the second relationship specifies the second ratio is not greater than the second threshold value, or (iii) when the first relationship specifies the first ratio is not greater than the first threshold value, and the second relationship specifies the second ratio is greater than the second threshold value.

19. The one or more non-transitory machine-readable media of claim 17, wherein determining, based on whether the first ratio is zero or based on the first and second relationships, that (i) the mobile device does not reside inside any building, (ii) the mobile device resides inside a particular building from the identified buildings, or (iii) that one or more of the identified buildings are candidate buildings that include a building in which the mobile device resides comprises:
determining that the mobile device does not reside inside any building when the first ratio is zero.

20. The one or more non-transitory machine-readable media of claim 17, wherein determining, based on whether the first ratio is zero or based on the first and second relationships, that (i) the mobile device does not reside inside any building, (ii) the mobile device resides inside a particular building from the identified buildings, or (iii) that one or more of the identified buildings are candidate buildings that include a building in which the mobile device resides comprises:
determining that the mobile device resides inside a building from the identified buildings with a building footprint that overlaps the user footprint more than any other building footprint of any other identified building when the first relationship specifies the first ratio is greater than the first threshold value, and the second relationship specifies the second ratio is not greater than the second threshold value.

21. The one or more non-transitory machine-readable media of claim 17, wherein determining, based on whether the first ratio is zero or based on the first and second relationships, that (i) the mobile device does not reside inside any building, (ii) the mobile device resides inside a particular building from the identified buildings, or (iii) that one or more of the identified buildings are candidate buildings that include a building in which the mobile device resides comprises:

determining that the identified buildings are candidate buildings that include a building in which the mobile device resides (i) when the first relationship specifies the first ratio is greater than the first threshold value, and the second relationship specifies the second ratio is greater than the second threshold value, (ii) when the first relationship specifies the first ratio is not greater than the first threshold value, and the second relationship specifies the second ratio is not greater than the second threshold value, or (iii) when the first relationship specifies the first ratio is not greater than the first threshold value, and the second relationship specifies the second ratio is greater than the second threshold value.

22. The one or more non-transitory machine-readable media of claim 17, wherein determining, based on whether the first ratio is zero or based on the first and second relationships, that (i) the mobile device does not reside inside any building, (ii) the mobile device resides inside a particular building from the identified buildings, or (iii) that one or more of the identified buildings are candidate buildings that include a building in which the mobile device resides comprises:

determining that the mobile device does not reside inside any building when the first ratio is zero;
determining that the mobile device resides inside a building from the identified buildings with a building footprint that overlaps the user footprint more than any other building footprint of any other identified building when the first relationship specifies the first ratio is greater than the first threshold value, and the second relationship specifies the second ratio is not greater than the second threshold value;
determining that the mobile device resides inside one of the identified buildings when the first relationship specifies the first ratio is greater than the first threshold value, and the second relationship specifies the second ratio is greater than the second threshold value; and
determining that the mobile device does not reside inside any building when (i) the first relationship specifies the first ratio is not greater than the first threshold value, and the second relationship specifies the second ratio is not greater than the second threshold value, or (ii) the first relationship specifies the first ratio is not greater than the first threshold value, and the second relationship specifies the second ratio is greater than the second threshold value.

23. The one or more non-transitory machine-readable media of claim 17, wherein determining, based on whether the first ratio is zero or based on the first and second relationships, that (i) the mobile device does not reside inside any building, (ii) the mobile device resides inside a particular building from the identified buildings, or (iii) that one or more of the identified buildings are candidate buildings that include a building in which the mobile device resides comprises:

determining that the mobile device resides inside one of the identified buildings when the first relationship specifies the first ratio is greater than the first threshold value, and the second relationship specifies the second ratio is greater than the second threshold value.

24. The one or more non-transitory machine-readable media of claim 17, wherein determining, based on whether the first ratio is zero or based on the first and second relationships, that (i) the mobile device does not reside inside any building, (ii) the mobile device resides inside a particular building from the identified buildings, or (iii) that one or more of the identified buildings are candidate buildings that include a building in which the mobile device resides comprises:

determining that the mobile device does not reside inside any building when (i) the first relationship specifies the first ratio is not greater than the first threshold value, and the second relationship specifies the second ratio is not greater than the second threshold value, or (ii) the first relationship specifies the first ratio is not greater than the first threshold value, and the second relationship specifies the second ratio is greater than the second threshold value.

25. One or more non-transitory machine-readable media embodying program instructions that, when executed by one or more machines, cause the one or more machines to implement a method for determining an indoor or outdoor location of a mobile device, wherein the method comprises:

determining a user footprint;
identifying each building with a building footprint that at least partially overlaps with the user footprint; and
determining, based on the user footprint and the building footprints of the identified buildings, that (i) the mobile device does not reside inside any building, (ii) the mobile device resides inside a particular building from the identified buildings, or (iii) that one or more of the identified buildings are candidate buildings that include a building in which the mobile device resides;
if the mobile device is determined to not reside inside any building, calibrating a pressure sensor of the mobile device using one or more altitudes of outdoor ground terrain within the user footprint if the one or more altitudes are all within a threshold amount of altitude from each other; and
if the mobile device is determined to reside inside a particular building from the identified buildings or if one or more of the identified buildings are determined to be candidate buildings in which the mobile device resides, (i) determining a representative altitude of the mobile device and calibrating the pressure sensor of the mobile device using the determined representative altitude, or (ii) determining that the representative altitude of the mobile device cannot be determined for use in calibrating the pressure sensor,
wherein when the mobile device is determined to reside inside a particular building from the identified buildings or when one or more of the identified buildings are determined to be candidate buildings in which the mobile device resides, (i) determining a representative altitude of the mobile device and calibrating the pressure sensor of the mobile device using the determined representative altitude, or (ii) determining that the representative altitude of the mobile device cannot be determined for use in calibrating the pressure sensor comprises:
  accessing information for the particular building or for each of the candidate buildings to determine if that building is a single-story building;
  determining if the particular building or each of the candidate buildings is a single-story building;
  determining that the location of the mobile device is on a ground-level floor of the particular building and calibrating the pressure sensor of the mobile device using a representative altitude of the mobile device that is equal to a representative ground-level altitude of the particular building if the particular building is a single-story building, or determining that the location of the mobile device is on a ground-level floor of one of the candidate buildings and calibrating the pressure sensor of the mobile device using a representative altitude of the mobile device that is equal to a representative ground-level altitude of the candidate buildings if each of the candidate buildings is a single-story building or if a number of the candidate buildings that are single-story buildings exceeds a threshold amount; and
  determining that the location of the mobile device cannot be determined to be on a ground-level floor of the particular building and determining that a representative altitude of the mobile device cannot be determined as a representative ground-level altitude of the particular building for use in calibrating the pressure sensor if the particular building is not a single-story building, or determining that the location of the mobile device cannot be determined to be on a ground-level floor of one of the candidate buildings and determining that a representative altitude of the mobile device cannot be determined as a representative ground-level altitude of the candidate buildings for use in calibrating the pressure sensor if any of the candidate buildings is not a single-story building or if the number of the candidate buildings that are single-story buildings is less than the threshold amount.

26. The one or more non-transitory machine-readable media of claim 25, wherein determining if the particular building or each of the candidate buildings is a single-story building comprises:
  for the particular building or for each of the candidate buildings:
    retrieving one or more floor heights or floor labels for that building from a database;
    determining if the one or more retrieved floor heights or floor labels for that building specify (i) only a ground-level floor height or only a ground-level floor for that building or (ii) more than one floor height or more than one floor for that building;
    if the one or more retrieved floor heights or floor labels for that building specify only a ground-level floor height or only a ground-level floor for that building, determining that building is a single-story building; and
    if the one or more retrieved floor heights or floor labels for that building specify more than one floor height or more than one floor for that building, determining that building is not a single-story building.

27. The one or more non-transitory machine-readable media of claim 25, wherein determining if the particular building or each of the candidate buildings is a single-story building comprises:
  for the particular building or for each of the candidate buildings:
    retrieving a height or altitude for that building from a database;
    determining if the height or altitude indicates that building is more likely to be a single-story building or to not be a single-story building;
    if the height or altitude indicates that building is more likely to be a single-story building than to not be a single-story building, determining that building is a single-story building; and
    if the height or altitude indicates that building is more likely to not be a single-story building than to be a single-story building, determining that building is not a single-story building.

28. The one or more non-transitory machine-readable media of claim 27, wherein determining if the height or altitude indicates that building is more likely to be a single-story building or to not be a single-story building comprises:
  determining if the retrieved height of that building is greater than a threshold maximum height or determining if the retrieved altitude of that building is greater than a threshold maximum altitude;
  if the retrieved height of that building is not greater than the threshold maximum height, determining that the height indicates that building is more likely to be a single-story building than to not be a single-story building, or if the retrieved altitude of that building is not greater than the threshold maximum altitude, determining that the altitude indicates that building is more likely to be a single-story building than not a single-story building; and
  if the retrieved height of that building is greater than the threshold maximum height, determining that the height indicates that building is more likely to not be a single-story building than to be a single-story building, or if the retrieved altitude of that building is greater than the threshold maximum altitude, determining that the altitude indicates that building is more likely to not be a single-story building than to be a single-story building.

29. The one or more non-transitory machine-readable media of claim 25, wherein the location of the mobile device is determined to be on a ground-level floor of one of the candidate buildings and the pressure sensor of the mobile device is calibrated using a representative altitude of the mobile device that is equal to a representative ground-level altitude of the candidate buildings if each of the candidate buildings is a single-story building, and wherein the location of the mobile device cannot be determined to be on a ground-level floor of one of the candidate buildings and a representative altitude of the mobile device cannot be determined as a representative ground-level altitude of the candidate buildings for use in calibrating the pressure sensor if any of the candidate buildings is not a single-story building.

30. The one or more non-transitory machine-readable media of claim 25, wherein the location of the mobile device is determined to be on a ground-level floor of one of the candidate buildings and the pressure sensor of the mobile device is calibrated using a representative altitude of the mobile device that is equal to a representative ground-level altitude of the candidate buildings if the number of the candidate buildings that are single-story buildings exceeds the threshold amount, and wherein the location of the mobile device cannot be determined to be on a ground-level floor of one of the candidate buildings and a representative altitude of the mobile device cannot be determined as a representative ground-level altitude of the candidate buildings for use in calibrating the pressure sensor if the number of the candidate buildings that are single-story buildings is less than the threshold amount.

* * * * *